US011244272B2

(12) United States Patent
Gotou et al.

(10) Patent No.: US 11,244,272 B2
(45) Date of Patent: Feb. 8, 2022

(54) PATROL CHECK SYSTEM, PATROL CHECK DEVICE, PATROL CHECK METHOD, AND STORAGE MEDIUM

(71) Applicant: Yokogawa Electric Corporation, Tokyo (JP)

(72) Inventors: Hirotsugu Gotou, Tokyo (JP); Masaki Ishii, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 632 days.

(21) Appl. No.: 15/800,402

(22) Filed: Nov. 1, 2017

(65) Prior Publication Data

US 2018/0129193 A1    May 10, 2018

(30) Foreign Application Priority Data

Nov. 4, 2016 (JP) .............................. JP2016-216675

(51) Int. Cl.
*G06Q 10/06* (2012.01)
*G06Q 10/00* (2012.01)
*G05B 19/418* (2006.01)

(52) U.S. Cl.
CPC ....... *G06Q 10/06395* (2013.01); *G06Q 10/00* (2013.01); *G05B 19/4183* (2013.01); *G05B 19/41875* (2013.01)

(58) Field of Classification Search
None
See application file for complete search history.

(56) References Cited

U.S. PATENT DOCUMENTS

| 10,810,529 B2 * | 10/2020 | Miller .................... G06Q 10/06 |
| 2005/0087235 A1 | 4/2005 | Skorpik et al. |

(Continued)

FOREIGN PATENT DOCUMENTS

| CN | 104992375 A | 10/2015 |
| CN | 105868927 A | 8/2016 |

(Continued)

OTHER PUBLICATIONS

Anonymous: "Connect Sensor Data to any Cloud Platform with Meshlium IoT Gateway Libelium", Libelium, Oct. 26, 2016, Retrieved from the Internet: URL:https://web.archive.org/web/20161026103415/http://www.libelium.com/products/plug-sense/wsn/ pp. 2-5 (total 6 pages).

(Continued)

*Primary Examiner* — Stephanie Z Delich
(74) *Attorney, Agent, or Firm* — Sughrue Mion, PLLC

(57) ABSTRACT

A patrol check system according to one aspect of the present invention includes at least one data collection device installed in a first position in an area in which facilities are installed, the data collection device being configured to collects measured values indicating a state of at least one facility installed in a first range around the first position, the facility belonging to a check target of the data collection device, the measured values being measured by a measurement device installed in the facility, and a patrol check device configured to acquire the measured values collected by the data collection device, and reflect the acquired measured values in a check result of a check record in which check items to be performed on the facility belonging to the check target of the data collection device are included.

10 Claims, 13 Drawing Sheets

(56) References Cited

U.S. PATENT DOCUMENTS

| | | | | |
|---|---|---|---|---|
| 2008/0157919 | A1* | 7/2008 | Sugiura | B60R 25/24 340/5.61 |
| 2010/0039319 | A1* | 2/2010 | Cameron | B66C 13/16 342/357.27 |
| 2010/0161374 | A1* | 6/2010 | Horta | G06Q 10/00 705/7.41 |
| 2013/0217321 | A1* | 8/2013 | Tobo | G05B 19/4183 455/39 |
| 2014/0247151 | A1* | 9/2014 | Proud | A61B 5/0024 340/870.02 |
| 2016/0334778 | A1* | 11/2016 | Cope | G05B 19/401 |
| 2017/0090466 | A1* | 3/2017 | Uomori | G05B 19/41875 |
| 2018/0006888 | A1* | 1/2018 | Vaughn | H04L 41/0826 |

FOREIGN PATENT DOCUMENTS

| | | |
|---|---|---|
| EP | 3 059 700 A1 | 8/2016 |
| JP | 2002-297669 A | 10/2002 |
| JP | 2003-162320 A | 6/2003 |
| JP | 2005-276123 A | 10/2005 |
| JP | 2007-156670 A | 6/2007 |
| JP | 2008-225730 A | 9/2008 |
| JP | 2015-036908 A | 2/2015 |
| JP | 2016-162334 A | 9/2016 |
| JP | 2016-177800 A | 10/2016 |

OTHER PUBLICATIONS

Anonymous: "Bulletin 01R01A01-00E Versatile Device Management Wizard Versatile Device Management Wizard FieldMate", May 14, 2016, Retrieved from the Internet: URL:https://web.archive.org/web/20160514060752if_/http://www.yokogawa.com/fld/pdf/fieldmate/BU01R01A01-00E.pdf, pp. 2-3 (total 5 pages).

Anonymous: "Yokogawa Releases Plant Resource Manager (PRM) R3.31 Yokogawa Electric Corporation", Sep. 6, 2016, XP055635361, https://www.yokogawa.com/news/press-releases/2016/2016-09-06, pp. 1-4 (5 pages total).

* cited by examiner

PATROL CHECK SYSTEM, PATROL CHECK DEVICE, PATROL CHECK METHOD, AND STORAGE MEDIUM

TECHNICAL FIELD

Field of the Invention

The present invention relates to a patrol check system, a patrol check device, a patrol check method, and a storage medium.

The present application claims priority based on Japanese patent application 2016-216675, filed on Nov. 4, 2016 and includes herein by reference the content thereof.

Description of Related Art

In a plant with various facilities, routine checking work and work dealing with problems such as malfunctions or failures are performed for respective facilities located at specific places in a plant. A worker who performs such work carries, for example, a check record of a paper medium in which check items or content of checking work in each facility is shown, patrols the inside of the plant, and performs work according to the carried check record in each facility. For example, the worker may perform checking work according to the five senses such as visual checking, tapping, and smelling, manual measurement work using a measurement device such as a thermometer or a vibrometer, or the like according to the carried check record in each facility to which the work goes. The worker may perform simple maintenance work in a facility to which the worker goes. For example, when a facility to which the worker goes is a rotation motor, the worker may perform maintenance work such as directing oil to the rotation motor or tightening screws. The worker inputs results of the checking work, the measurement work, and the maintenance work performed for each facility to the check record which is a paper medium carried by the worker, every time.

In routine checking work, a worker goes to a place in each facility that is a target to be checked along a pre-assigned check route, and performs checking work, measurement work, and maintenance work for each check item on the basis of the check list shown in the check record. The worker returns to, for example, an office or the like after completing the work for all facilities shown in the check route. Then, the worker creates a report in which results of the checking work, the measurement work, and the maintenance work performed on each facility are summarized, and presents the report to, for example, a manager managing the respective facilities located in the plant, who waits in an office or the like. The manager checks the report content summarized in the report submitted by the worker, ascertains whether operations are normal (normality) in each facility located in the plant, and stores the submitted report in a history.

Thus, in the plant, daily work (hereinafter referred to as "patrol checking") such as routine checking work, measurement work, maintenance work, or reporting for each facility located in the plant is performed on the basis of a check record or a report that is a paper medium. In patrol checking according to this paper medium, there are various problems from the viewpoint of management of the check record or the report (for example, a possibility of loss or damage), the viewpoint of checking work of the worker being insufficient (for example, checking mistakes or omission), the viewpoint of understanding of normality of facilities (for example, validity of report content), and the viewpoint of efficiency of patrol checking (for example, time required for a sequence of patrol checking work). For example, when a check record as a paper medium gets wet due to rain in patrol checking on a rainy day, the check record may be damaged or results (for example, of tests) written on a check list shown in the check record may not be able to be seen. In this case, it takes much effort for the worker to create the report on the basis of the check record (for example, returning to a place in a facility and confirming), and this takes much time. For example, when there is a mistake or an omission in the checking work of the worker or when an abnormality or failure in a facility is reported in the report content documented in the report submitted by the worker, the manager may issue an instruction for re-checking or taking measures with respect to the reported abnormality or failure instead of approving the report content of the report. In this case, the worker goes back to a place in a target facility, and redoes the checking work, or takes measures in response to the abnormality or failure, and thus it takes much time to complete the patrol checking.

Therefore, for example, as in Japanese Unexamined Patent Application, First Publication No. 2016-162334 (hereinafter, referred to as "Patent Document 1") or Japanese Unexamined Patent Application, First Publication No. 2015-036908 (hereinafter, referred to as "Patent Document 2"), a technology of a check system that performs checking work for each facility using a mobile terminal device carried by a worker, that is, a check system aiming to be paperless has been proposed. In the technology of the check system disclosed in Patent Document 1, a mobile terminal recognizes each facility using identification information transmitted from a beacon tag installed in the facility and starts a check program associated with the recognized facility to request the worker to perform checking work. In the technology of the check system disclosed in Patent Document 1, a mobile terminal transmits check results input by a worker to a server that manages check data. In the technology of the check system disclosed in Patent Document 2, when a mobile terminal is determined to be in an online environment, check software for checking a facility is downloaded from a server and started, and results of the checking work are uploaded to a server. Accordingly, in the technology of the check systems disclosed in Patent Document 1 or 2, checking work can be performed by acquiring a check program or check software that is considered to correspond to a check record for checking a facility at the position of the facility to be checked, and mistakes or omissions in the checking work can be reduced. In the technology of the check systems disclosed in Patent Document 1 or 2, the results of the checking work can be managed as electronic data.

BACKGROUND OF THE INVENTION

As described above, in Patent Document 1 or 2, a technology in which a mobile terminal device acquires a check program or check software considered to correspond to a check record when a worker goes to a place in a facility that is a check target and a technology for transmitting (uploading) results of the checking work to a server are disclosed. However, in the technology of the check systems disclosed in Patent Document 1 or 2, checking work according to the check list shown in the acquired check record is performed by a worker, similar to patrol checking according to a paper medium. In the technology of the check systems disclosed in Patent Document 1 or 2, creation of a report according to the results of the transmitted (uploaded) checking work is not disclosed. Therefore, even when the technology of the check systems disclosed in Patent Document 1 or 2 is used, a worker patrols the inside of the plant and performs checking work, measurement work, maintenance work, or the like, similar to the patrol checking according to a paper medium. For example, the worker returns to an office or the like, and performs a procedure of creating a report and obtaining approval of report content from a manager.

As described above, in the technology of the check systems disclosed in Patent Document 1 or 2, the problem from the viewpoint of management of the check record or the report (for example, a possibility of loss or damage) or the problem from the viewpoint of checking work of the worker being insufficient (for example, checking mistakes or omissions) checking work can be solved, but the problem from the viewpoint of understanding of normality of facilities (for example, validity of report content) or the problem from the viewpoint of efficiency of patrol checking (for example, time required for a sequence of patrol checking work) has not yet been solved. That is, in the technology of the check systems disclosed in Patent Document 1 or 2, since creation of a report, approval of a manager for the report, and instructing taking measures with respect to an abnormality or failure in a facility described in the report content are performed, for example, after the worker returns to an office or the like, there is no possibility of the worker going back to a place in a facility before ending a sequence of patrol checking work. Therefore, in the technology of the check systems disclosed in Patent Document 1 or 2, a movement distance of a worker performing respective items of work in patrol checking is the same as that during the time of patrol checking according to a check record that is a paper medium of the related art.

In the technology of the check systems disclosed in Patent Document 1 or 2, since check results are not collected for every facility subjected to checking, summarizing check results for each facility, redoing of checking work (re-checking), or taking measures with respect to an abnormality or failure of facilities cannot be rapidly performed, and the worker ends the work for all the facilities, returns to, for example, an office or the like, and then, performs a response. That is, in the technology of the check systems disclosed in Patent Document 1 or 2, an appropriate response cannot be performed in a timely manner.

One aspect of the present invention provides a plant control system, a patrol check device, a patrol check method, and a storage medium capable of improving reliability of respective items of work in work that a worker performs while patrolling respective facilities located in a plant and shortening a time required for a sequence of work.

SUMMARY OF THE INVENTION

A patrol check system according to a first aspect of the present invention may include at least one data collection device installed in a first position in an area in which facilities are installed, the data collection device being configured to collects measured values indicating a state of at least one facility installed in a first range around the first position, the facility belonging to a check target of the data collection device, the measured values being measured by a measurement device installed in the facility, and a patrol check device configured to acquire the measured values collected by the data collection device, and reflect the acquired measured values in a check result of a check record in which check items to be performed on the facility belonging to the check target of the data collection device are included.

The patrol check system according to the first aspect may further include a check server device including a storage device storing at least the check record associated with each of the data collection devices. The patrol check device may be configured to acquire the check record from the check server device, and reflect measured values in the check result associated with respective one of the measured values in the acquired check record.

In the patrol check system according to the first aspect, in the check record, the measurement devices may be associated with respective one of the check items. The patrol check device may be configured to reflect the measured values measured by the measurement devices in the respective one of the check items in the check record as the check result of the respective one of the check items.

In the patrol check system according to the first aspect, the check server device may further store, in the storage device, a check route indicating a route for patrolling the data collection devices installed in the area in which the facilities are installed. The patrol check device may be configured to display the check route acquired from the check server device, and to reflect measured values acquired at a position in an acquisition range in which the measured values collected by the data collection device are able to be acquired, in the check record associated with the data collection device.

In the patrol check system according to the first aspect, the patrol check device may be configured to input the check record in which the measured values have been reflected to the check server device as a report, and display a check instruction according to the report.

In the patrol check system according to the first aspect, the patrol check device may be configured to request approval of at least one of the check record in which the measured values have been reflected and a report of the check record, and display a result of the approval.

A patrol check device according to a second aspect of the present invention may be configured to acquire measured values collected by at least one data collection device installed in a first position in an area in which facilities are installed, the measured values indicating a state of at least one facility installed in a first range around the first position, the facility belonging to a check target of the data collection device, the measured values being measured by a measurement device installed in the facility, the patrol check device being configured to reflect the acquired measured values in a check result of a check record in which check items to be performed on the facility belonging to the check target of the data collection device are included.

The patrol check device according to the second aspect may be configured to acquire the check record from a check server device including a storage device that stores at least the check record associated with each of the data collection devices, and reflect measured values in the check result associated with respective one of the measured values in the acquired check record.

The patrol check device according to the second aspect may include a device communicator configured to perform communication with the data collection device, a server communicator configured to perform communication with the check server device, and a display configured to display the check record acquired from the check server device and the check record in which the measured values have been reflected.

The patrol check device according to the second aspect may further include a check record data storage storing at least the check record acquired from the check server device and the check record in which the measured values have been reflected, and an approval requestor configured to request approval of the check record in which the measured values have been reflected as a report.

In the patrol check device according to the second aspect, in the check record, the measurement devices may be associated with respective one of the check items. The patrol check device may be configured to reflect the measured values measured by the measurement devices in the respective one of the check items in the check record as the check result of the respective one of the check items.

In the patrol check device according to the second aspect, the patrol check device may be configured to acquire a check route indicating a route for patrolling the data collection devices installed in the area in which the facilities are installed, display the acquired check route, and reflect measured values acquired at a position in an acquisition range in which the measured values collected by the data collection device are able to be acquired, in the check record associated with the data collection device.

In the patrol check device according to the second aspect, the patrol check device may be configured to input the check record in which the measured values have been reflected to the check server device as a report, and display a check instruction according to the report.

In the patrol check device according to the second aspect, the patrol check device may be configured to request approval of at least one of the check record in which the measured values have been reflected and a report of the check record, and display a result of the approval.

A patrol check method according to a third aspect of the present invention may include collecting measured values, using at least one data collection device installed in a first position in an area in which facilities are installed, the measured values indicating a state of at least one facility installed in a first range around the first position, the facility belonging to a check target of the data collection device, the measured values being measured by a measurement device installed in the facility, acquiring the measured values collected by the data collection device, and reflecting the acquired measured values in a check result of a check record in which check items to be performed on the facility belonging to the check target of the data collection device are included.

The patrol check method according to the third aspect may further include acquiring the check record from a check server device including a storage device that stores at least the check record associated with each of the data collection devices. Reflecting the acquired measured values may include reflecting the acquired measured values in the check result associated with respective one of the acquired measured values in the acquired check record.

In the patrol check method according to the third aspect, in the check record, the measurement devices may be associated with respective one of the check items. Reflecting the acquired measured values may include reflecting the measured values measured by the measurement devices in the respective one of the check items in the check record as the check result of the respective one of the check items.

The patrol check method according to the third aspect may further include acquiring a check route indicating a route for patrolling the data collection devices installed in the area in which the facilities are installed, and displaying the acquired check route. Reflecting the acquired measured values may include reflecting the measured values acquired at a position in an acquisition range in which the measured values collected by the data collection device are able to be acquired, in the check record associated with the data collection device.

The patrol check method according to the third aspect may further include inputting the check record in which the measured values have been reflected to the check server device as a report, and displaying a check instruction according to the report.

A non-transitory computer-readable storage medium according to a fourth aspect of the present invention may store a program, which when executed by a computer in a patrol check device, causes the computer to acquire measured values collected by at least one data collection device installed in a first position in an area in which facilities are installed, the data collection device collecting the measured values indicating a state of at least one facility installed in a first range around the first position, the facility belonging to a check target of the data collection device, the measured values being measured by a measurement device installed in the facility, and reflect the acquired measured values in a check result of a check record in which check items to be performed on the facility belonging to the check target of the data collection device are included.

According to one aspect of the present invention, an effect that it is possible to provide a patrol check system, a patrol check device, a patrol check method, and a storage medium capable of improving reliability of respective items of work in work that a worker performs while patrolling respective facilities located in a plant and shortening a time required for a sequence of work can be obtained.

DETAILED DESCRIPTION OF THE INVENTION

First Embodiment

Figure 1:
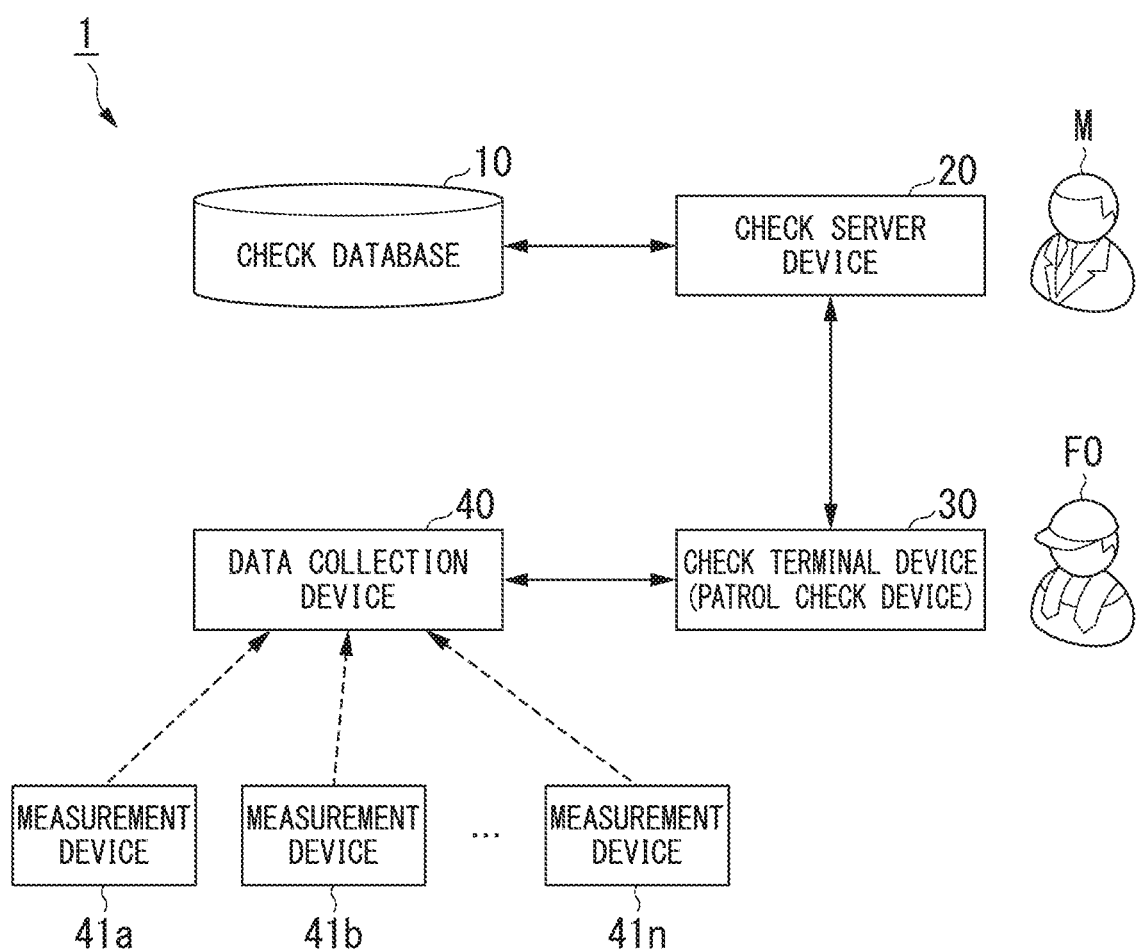
FIG. 1 is a block diagram showing a schematic configuration of a patrol check system according to a first embodiment of the present invention.

Hereinafter, embodiments of the present invention will be described with reference to the drawings. FIG. 1 is a block diagram showing a schematic configuration of a patrol check system according to a first embodiment of the present invention. The patrol check system 1 includes a check database 10, a check server device 20, a check terminal device 30, a data collection device 40, and at least one measurement device 41. FIG. 1 shows a configuration of the patrol check system 1 including n measurement devices 41 (measurement devices 41a to 41n) (n=natural number and positive integer).

The patrol check system 1 is a system with which a worker FO patrols the inside of the plant and performs various work (hereinafter, such sequence of work are referred to as "patrol checking") such as checking work, measurement work, and maintenance work for respective facilities arranged in the plant, or report creation work. The plant includes a plant that manage and controls a well source such as a gas field or an oil well, or surroundings thereof, a plant that manage and controls power generation of hydropower, thermal power, nuclear power, or the like, a plant that manages and controls environmental power generation such as sunlight or wind power, a plant that manages and controls water and sewage or a dam, and the like, in addition to industrial plants in which refinement of petroleum or production of chemical products is performed.

In the plant into which the patrol check system 1 has been built, the worker FO carries the check terminal device 30 and patrols check points installed in the plant according to a check route acquired in advance from the check server device 20 to perform respective items of work in the patrol checking. In the patrol check system 1, the data collection devices 40 are installed at each check point. Facilities arranged in a predetermined range (area) around a position established as the check point belong to each data collection device 40. The facilities belonging to the respective check points (the data collection devices 40) include a facility in which the measurement device 41 is installed in a predetermined position. In other words, in the patrol check system 1, a measurement device 41 installed in advance in a facility arranged within a predetermined range (area) around the check point belongs to the data collection device 40 installed as the check point.

The worker FO operates the check terminal device 30 at each check point and acquires a check record associated with the check point in the current position from the check server device 20. In this case, in the check terminal device 30, data (measured value) of the measurement device 41 belonging to the data collection device 40 is also acquired from the data collection device 40 which is each check point. Accordingly, in the patrol check system 1, a measured value of the associated measurement device 41 is reflected in the check list shown in the check record associated with each check point.

The worker FO moves to the next check point after the check list (check record) in which the measured value of the measurement device 41 has been reflected is approved by a manager M who waits in the office or the like, for example.

Thus, in the plant into which the patrol check system 1 has been built, the worker FO goes to the check point while carrying the check terminal device 30, acquires the associated check record from the check server device 20, and patrols the respective check points installed in the plant while obtaining approval from the manager M for the check list (check record) in which the measured values of the facilities arranged in the predetermined range (area) around the check point have been reflected. As a result, in the plant into which the patrol check system 1 has been built, it is possible to perform a sequence of patrol checking work for the respective facilities arranged in the plant.

In general, a plurality of worker FO belong to the plant. The respective workers FO perform respective items of patrol checking work by patrolling the check points set in the range in the plant of which the respective workers are in charge while carrying the check terminal device 30. Therefore, the patrol check system 1 may include a plurality of check terminal devices 30 that are carried by the respective workers FO. It is conceivable that a plurality of check points are installed in the plant. Therefore, the patrol check system 1 may include a plurality of data collection devices 40 installed at the respective check points. In FIG. 1, the patrol check system 1 including the check database 10, the check server device 20, one check terminal device 30, and one data collection device 40 to which n measurement devices 41a to 41n belong is shown.

The check server device 20 is a server device that manages various types of data or information regarding facilities arranged in a plant into which the patrol check system 1 has been built. The check server device 20 is installed in an office or the like that manages an operation of the respective facilities arranged in the plant, for example.

The check server device 20 communicates with the check terminal device 30 over a wireless communication network built into the plant and transmits and receives data or information to and from the check terminal device 30. More specifically, the check server device 20 acquires data of the check route when the worker FO performs the patrol check or the check record associated with the check point at where the worker FO has arrived from the check database 10 according to a request from the check terminal device 30, and transmits (outputs) the acquired data to the check terminal device 30. The check server device 20 receives the result of work such as the checking work, the measurement work, and the maintenance work, or data or information of the check record in which the result has been reflected, that is, the result of the patrol checking work performed by the worker FO, which is transmitted from the check terminal device 30, and stores and manages the received data or information in the check database 10.

The check server device 20 may be a cloud server device included in a so-called cloud computing system that holds and uses data on the Internet.

The check database 10 is a storage device that stores various types of data regarding patrol checking work that is performed on the respective facilities arranged in the plant into which the patrol check system 1 has been built. The check database 10 is installed in, for example, an office and performs exchange of data with the check server device 20, similar to the check server device 20.

The check database 10 stores, for example, data of the check route in which a patrol route when the patrol check is performed is shown, or a check list indicating the details (items) of various work such as checking work, measurement work, and maintenance work (work for coping with problems) to be performed on each facility arranged in the plant, as a database that is data of a check record. In the check route stored in the check database 10, a movement order of check points installed in the plant is shown. In the check record stored in the check database 10, a check list indicating the details (items) of work to be performed on the facilities belonging to each check point is collected and associated with each check point installed in the plant.

The check database 10 stores, for example, data of a report in which the result of work such as checking work, measurement work, and maintenance work performed on the respective facilities arranged in the plant into which the patrol check system 1 has been built is collected as a database.

The check database 10 includes various memories such as a Read Only Memory (ROM), a Random Access Memory (RAM), and a flash memory or a storage device such as a Hard Disk Drive (HDD). Data or information stored in the check database 10 is not limited to the data of the check route or the check record as described above, but include various types of data or information that is used in the patrol check system 1. For example, the check database 10 may store a check program or check software that is executed by the check server device 20 or the check terminal device 30 when the patrol check is performed.

When the check server device 20 is a cloud server device included in a cloud computing system, the check database 10 may be a storage device that holds data on the Internet that the cloud server device uses in the cloud computing system.

The check terminal device 30 is a patrol check device that is used when the worker FO performs a patrol checking work in a plant into which the patrol check system 1 has been built. Since the check terminal device 30 is carried by the worker FO when worker FO performs the patrol check and is used while the worker FO patrols the check point installed in a range of which the worker FO is in charge in the plant, the check terminal device 30 is configured as a mobile terminal device. In the patrol check system 1, the check terminal device 30 and the check server device 20 are connected by the wireless communication network built into the plant, and the check terminal device 30 operates as a client of the check server device 20. That is, in the patrol check system 1, the check terminal device 30 and the check server device 20 are configured as a client-server type system.

The check terminal device 30 may be a mobile terminal device that is used exclusively in the plant. The check terminal device 30 may be, for example, a so-called mobile terminal device such as a tablet terminal including a function of a personal computer (PC) or a personal digital assistant (PDA). The check terminal device 30 may be a so-called mobile communication terminal device such as a smart phone in which a function of a mobile phone using an existing mobile communication network and a function of a personal digital assistant are combined.

In the following description, the check terminal device 30 includes a display that displays a text or an image, and a user interface that receives an operation of the worker FO, and is configured as a mobile terminal device on which a touch panel in which the display and the user interface are combined is mounted.

The check terminal device 30 includes a function of presenting a check route when the patrol check is performed or a check record associated with each check point to the worker FO. More specifically, the check terminal device 30 includes a function of acquiring the check route in which a check point patrolling order is shown from the check server device 20 according to an operation of the worker FO before the patrol check is started, and presenting the acquired check route to the worker FO. Using this function, the worker FO can easily confirm the order of the check point to which the worker FO goes in a current patrol check.

The check terminal device 30 includes a function of acquiring the data of the check record associated with the check points at a current arrival position from the check server device 20 according to an operation of the worker FO when the worker FO arrives at the check point, and presenting the acquired check record or the check list shown in the check record to the worker FO. Using this function, the worker FO can easily confirm the details of work such as checking work, measurement work, and maintenance work (hereinafter collectively referred to as "checking work) to be performed on the facility belonging to the check point in the current position from the check list presented by the check record, and easily input a result of the checking work performed according to the presented check list (hereinafter referred to as a check result) by operating the check terminal device 30.

The check terminal device 30 includes a function of acquiring the data (measured value) of the measurement devices 41 collected by the data collection device 40 and reflecting the acquired measured value of the measurement device 41 in the associated check item of the check list shown in the check record. More specifically, the check terminal device 30 includes a function of receiving (acquiring) the data (measured value) collected by the measurement device 41 belonging to this data collection device 40 from the data collection device 40 installed at the check point in the current position according to an operation of the worker FO having arrived at the check point, and inputting (reflecting) the acquired measured value of the measurement device 41 to the associated check item in the check list shown in the check record that has been already acquired to present the measured value to the worker FO. Using this function, the worker FO can easily confirm items of the checking work to which no measured values are input in the check list shown in the check record, that is, the details of the checking work required to be now performed, during the checking work that is performed on the facility belonging to the check point in the current position. The worker FO can perform only the checking work required to be performed and input a check result to the check terminal device 30.

In the patrol check system 1, as described above, a sequence of patrol checking work is performed by patrolling the respective check points while obtaining the approval of the manager M for the check list (check record) to which the measured value of the measurement device 41 belonging to the data collection device 40 installed at each check point has been input (reflected). In the following description, the check record acquired from the check server device 20 at each check point, and the check record to which the measured value of the measurement device 41 or the check result of the performed checking work by the worker FO has been input (reflected) are distinguished from each other. In the following description, the check record (check list) associated to each check point that the check terminal device 30 has acquired from the check server device 20 when the worker FO arrives at each check point, that is, the check record in which the measured value of the measurement device 41 or the check result of the worker FO is not reflected is referred to as an "check record". In the following description, a check record (a check list) to which the measured value of the measurement device 41 belonging to the data collection device 40 installed at each check point, or the check result of the checking work that the worker FO has performed at the check point in the current position has been input (reflect) is referred to as a "report".

The check terminal device 30 includes a function of presenting the report (the check record (check list) to which the measured value of the measurement device 41 or the check result of the performed checking work by the worker FO has been input) to the manager M. More specifically, the check terminal device 30 includes a function of transmitting (outputting) the report and the request for approval of this report to the check server device 20 according to an operation of the worker FO when the checking work at the check point in the current position has ended. Using this function, the worker FO can rapidly, accurately, and easily report the check result of the performed checking work at the check point in the current position to which the worker FO has gone in the current patrol check, as a report, and request the manager M to approve the report. The manager M can immediately confirms the measured value of the measurement device 41 or the check list (check record) to which the check result of the checking work performed by the worker FO has been input, that is, the result of the checking work performed by the worker FO, which is transmitted as a report from the check terminal device 30 by the check server device 20, and perform approval of the result of the checking work, an instruction of the re-checking, and an instruction of work such as maintenance work required to be newly performed.

The check terminal device 30 has a function of presenting a transmitted (output) determination result for the report to the worker FO. More specifically, the check terminal device 30 has a function of presenting the received information to the worker FO when a result of report approval of the manager M or the information on an instruction of a work to be newly performed is received from the check server device 20. Using this function, the worker FO can easily confirm whether the presented report has been approved, it is necessary to perform the checking work again, or it is necessary to perform a new checking work. When the presented report has been approved, the worker FO goes to the next check point. The worker FO performs the checking work of which the check result has not been approved again when the presented report has not been approved, and performs the new instructed checking work when the new checking work is required.

Thus, the check terminal device 30 communicates with the check server device 20 to transmit and receive data or information to and from the check server device 20 over the wireless communication network built into the plant. The check terminal device 30 acquires the measured value of the measurement devices 41 belonging to the data collection device 40 from the data collection device 40 installed as each check point, and reflects the measured value in the associated check item of the check list shown in the check record as a check result.

When the check server device 20 is a cloud server device included in a cloud computing system, the check terminal device 30 may be configured to be connected, for example, to the check server device 20 over the Internet that is a public communication network such as a web service. In this case, the patrol check system 1 is configured as a web application type system including the check terminal device 30 and the check server device 20.

The measurement device 41 is a sensor device that is installed in a predetermined position of the facility arranged in the plant and measures an operation state of the facility. The measurement device 41 measures an operation state (for example, pressure, temperature, or a flow rate) when the facility is operated at the installed position, associates a measured value indicating the operation state of the measured facility with identification information (identification ID; hereinafter referred to as a "device ID") for identifying the measurement device 41 itself, and outputs a result of the association to the data collection device 40. The measurement device 41 may be a field device (a measurer or an operator) installed for the purpose of monitoring of an operation state of each facility arranged in the plant or controlling of an operation of the facility. In this case, the field instrument as the measurement device 41 associates a measured value of an operation state of the monitored facility, a control value indicating a state of the operation of the controlled facility, and the identification information with one another, and outputs a result of the association to the data collection device 40.

In the present invention, the number of measurement devices 41 installed in one facility or an operation state of the facility measured by one measurement device 41 is not particularly defined. That is, one measurement device 41 may be installed for each facility, but a plurality of measurement devices may be installed for one facility. The measurement device 41 may be configured to be able to measure a plurality of operation states (for example, a pressure and a temperature) when the facility is operated. When the facility in which the measurement device 41 is installed is, for example, a rotation motor as a facility arranged in the plant, a measurement device 41a that measures the vibration of the rotation motor and a measurement device 41b that measures a temperature of the rotation motor may be installed in one rotation motor. For example, the measurement device 41a may measure the vibration and the temperature of the rotation motor.

In the present invention, a format of data of the measured value and the identification information that the measurement device 41 outputs to the data collection device 40 is not particularly defined regardless of an analog signal or a digital signal. In the present invention, an output method when the measurement device 41 outputs the measured value and the identification information to the data collection device 40 is not particularly defined regardless of wired or wireless.

The data collection device 40 is a gateway device installed in a predetermined position in the plant as a check point in the patrol check system 1. The data collection device 40 collects data output from the associated measurement devices 41 installed in advance in the facility arranged in a predetermined range (area) around the installation position, that is, the measured value associated with identification information (hereinafter simply referred to as "measured value"). The data collection device 40 outputs identification information (identification ID; hereinafter referred to as an "check ID") for identification as the check point installed in the plant or the data (measured value) collected from the associated measurement device 41 to the check terminal device 30 according to a request from the check terminal device 30.

In the present invention, a method when the data collection device 40 outputs identification information for identification as the check point or the data (measured value) collected from the associated measurement device 41 to the check terminal device 30, that is, a communication standard is not particularly defined regardless of wired or wireless. When the data collection device 40 and the check terminal device 30 include, for example, a function of performing transmission and reception of signals through wireless communication, such as a short-range wireless communication standard such as Bluetooth (registered trademark) or a wireless communication standard such as WiFi (registered trademark), the data collection device 40 transmits (outputs) identification information or collected data (measured value) through wireless communication according to the request transmitted through wireless communication from the check terminal device 30 present in a range (range in which communication is possible) in which data or information can be transmitted and received through the wireless communication. When the data collection device 40 and the check terminal device 30 include, for example, a function of performing a connection using a wired interface such as Universal Serial Bus (USB; registered trademark), the data collection device 40 outputs identification information or collected data (measured value) according to a request from the connected check terminal device 30. When the data collection device 40 and the check terminal device 30 include, for example, a function of performing transmission and reception of data or information using short-range wireless communication such as Near Field radio Communication (NFC), the data collection device 40 performs short-range wireless communication with the check terminal device 30 and outputs identification information requested from the check terminal device 30 or the collected data (measured value).

The data collection device 40 may be configured to include a function of a gateway included in a wireless communication network conforming to various industrial wireless communication standards built into the plant, such as ISA100.11a or Wireless HART (registered trademark). In this case, the data collection device 40 and the check terminal device 30 may perform transmission and reception of data or information over the wireless communication network built into the plant.

Figure 2:
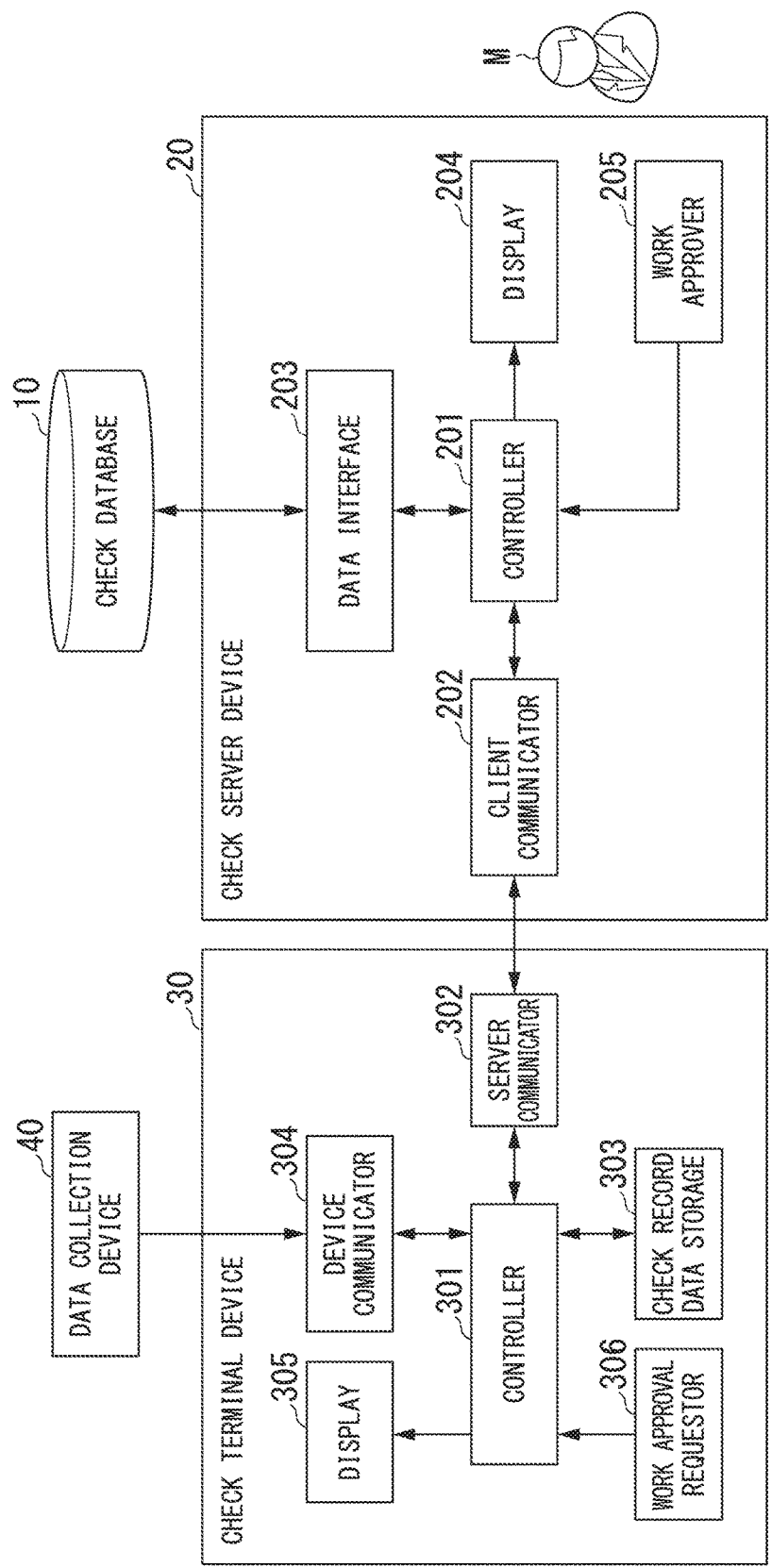
FIG. 2 is a block diagram showing a schematic configuration of a check server device and a check terminal device that constitute the patrol check system according to the first embodiment.

Next, respective configurations of the check server device 20 and the check terminal device 30 constituting the patrol check system 1 of the first embodiment of the present invention will be described. FIG. 2 is a block diagram showing a schematic configuration of the check server device 20 and the check terminal device 30 constituting the patrol check system 1 of the first embodiment. In FIG. 2, the check database 10 and the data collection device 40 constituting the patrol check system 1 are shown together. The check server device 20 includes a controller 201, a client communicator 202, a data interface 203, a display 204, and a work approver 205. The check terminal device 30 includes a controller 301, a server communicator 302, a check record data storage 303, a device communicator 304, a display 305, and a work approval requestor 306.

First, the respective components included in the check terminal device 30 will be described.

The controller 301 controls the overall operation of the check terminal device 30. More specifically, the controller 301 controls an operation of the respective components included in the check terminal device 30, that is, the server communicator 302, the check record data storage 303, the device communicator 304, the display 305, and the work approval requestor 306. The controller 301 controls an operation of components for check (not shown) included in the check terminal device 30 that are used when the worker FO performs checking work.

The server communicator 302 is, for example, a communication functional unit that performs communication with the client communicator 202 included in the check server device 20 over the wireless communication network built into the plant under the control of the communication output from the controller 301 according to the operation of the check terminal device 30 of the worker FO.

More specifically, the server communicator 302 transmits a request for a check route to the client communicator 202 according to the instruction to acquire the check route output from the controller 301 according to an operation of the check terminal device 30 of the worker FO before the patrol check is started. The server communicator 302 receives data of the check route transmitted from the client communicator 202 according to the request for the check route, and outputs the data to the controller 301. Thus, the controller 301 outputs the data of the check route output from the server communicator 302 to the check record data storage 303 to cause the data to be stored in the check record data storage 303. The server communicator 302 transmits the request for a check record to the client communicator 202 according to the instruction to acquire the check record output from the controller 301 according to the operation of the check terminal device 30 of the worker FO when the worker FO arrives at the check point. The server communicator 302 receives the data of the check record transmitted from the client communicator 202 according to the request for a check record, and outputs the data to the controller 301. Thus, the controller 301 outputs the data of the check record output from the server communicator 302 to the check record data storage 303 to cause the data to be stored in the check record data storage 303. The server communicator 302 transmits the data of the report and the request for approval to the client communicator 202 according to the instruction to request a request for the approval output from the controller 301 according to the operation of the check terminal device 30 of the worker FO when the checking work at the check point in the current position is ended and the manager M is requested to approve the report. The server communicator 302 receives the approval result transmitted from the client communicator 202 according to the request for approval or the information on the instruction of the checking work to be newly performed, and outputs the result or the information to the controller 301. Thus, the controller 301 outputs the approval result or the information on the instruction of the new checking work output from the server communicator 302 to the display 305 and displays the approval result or the information on the display 305.

The device communicator 304 is, for example, a communication functional unit that communicates with the data collection device 40 under the control of the communication output from the controller 301 according to the operation of the check terminal device 30 of the worker FO.

More specifically, the device communicator 304 transmits a request for data of the collected measured value to the data collection device 40 according to the instruction to acquire the measured value of the measurement device 41 output from the controller 301 according to the operation of the check terminal device 30 of the worker FO when the worker FO arrives at the check point. The device communicator 304 receives the data of the measured value transmitted from the data collection device 40 according to the request for data of a measured value and outputs the data to the controller 301. Thus, the controller 301 adds the data of the measured value output from the device communicator 304 to the data of the check record stored in the check record data storage 303, that is, reflects the measured value to the associated check item of the check list shown in the check record to update the check record stored in the check record data storage 303.

The check record data storage 303 is a data storage device that stores data output from the controller 301 or outputs the stored data to the controller 301 under the control of the controller 301. More specifically, the check record data storage 303 stores the check route output from the controller 301 or the data of the check record_under the control of data writing from the controller 301. The check record data storage 303 stores (updates) the data of the measured value of the measurement device 41 output from the controller 301 or data of the check result of the performed checking work by the worker FO in the data area of the check result included in the data of the stored check record (the data area of the check result of the items of the checking work designated from the controller 301 in the check list shown in the check record) under the control of the data updating from the controller 301. The check record data storage 303 output the stored data (such as the data of the check route or the data of the check record) to the controller 301 under the control of the data reading from the controller 301.

The check record data storage 303 may have, for example, a configuration of a dynamic random access memory (DRAM) that temporarily stores (holds) the data output from the controller 301 under the control of the controller 301.

The display 305 is a display that presents various types of information to the worker FO that carries the check terminal device 30 by generating and displaying a display screen according to the data output from the controller 301. More specifically, the display 305 generates a display screen according to the data of the check route or the check record output from the controller 301 and presents the display screen to the worker FO. The display 305 generates a display screen according to information on a result of the approval or an instruction of a new checking work output from the controller 301 and presents the display screen to the worker FO. The display 305 is, for example, a display device, such as a liquid crystal display (LCD).

The work approval requestor 306 is a user interface including, for example, buttons or switches, which receives an operation of a request for report approval of the worker FO. When the work approval requestor 306 receives the operation of the request for report approval by the worker FO, the work approval requestor 306 outputs information indicating that the request for report approval has been received, to the controller 301.

In the check terminal device 30, various operations are performed by the worker FO. More specifically, various operations such as not only an operation for requesting a request for approval of the report of the worker FO, but also an operation of instructing acquisition of the check route before the patrol check is started, an operation for instructing acquisition of the check record when the worker has arrived at the check point, an operation of instructing an operation of a component for check (not shown) when checking work is performed on a facility belonging to the check point, and an operation for inputting the check result of the performed checking work are performed by the worker FO in the check terminal device 30. In the following description, operations other than the operation for requesting the request for report approval performed by the worker FO is received by the work approval requestor 306. The check terminal device 30 is assumed to have a configuration of a mobile terminal device on which a touch panel is mounted in which a display that displays text or an image, and a user interface that receives an operation of the worker FO are combined. Therefore, in the check terminal device 30, the work approval requestor 306 includes a pressure sensor included in the display 305 and is configured as a touch panel combined with the display 305. Therefore, the work approval requestor 306 detects various touch operations such as tapping or flicking of the worker FO, and determines and receives various operations with respect to the check terminal device 30 of the worker FO from the detected operation. The work approval requestor 306 outputs information indicating the received operation of the worker FO, that is, information indicating the operation of various requests or instructions with respect to the check terminal device 30 as described above to the controller 301. For example, the work approval requestor 306 determines an operation for requesting a request for approval of the report from the worker FO from the detected touch operation of the worker FO. When the work approval requestor 306 determines that an operation of the worker FO is an operation for requesting the request for approval of the report, the work approval requestor 306 outputs information indicating that the request for approval of the report has been received to the controller 301. The work approval requestor 306 is not limited to the configuration of the touch panel combined with the display 305.

Next, the respective components included in the check server device 20 will be described.

The controller 201 controls the overall operation of the check server device 20. More specifically, the controller 201 controls the operation of the respective components included in the check server device 20, that is, the client communicator 202, the data interface 203, the display 204, and the work approver 205.

The client communicator 202 is a communication functional unit that performs communication with the server communicator 302 included in the check terminal device 30 over the wireless communication network built into the plant under the control of the communication output from the controller 301.

More specifically, when the client communicator 202 receives a request for the check route transmitted from the server communicator 302, the client communicator 202 outputs information indicating that the check route has been requested to the controller 201. Thus, the controller 201 reads the requested data of the checks route from the check database 10 via the data interface 203, and outputs the read data of the check route to the client communicator 202. The client communicator 202 transmits the data of the check route output from the controller 201 to the server communicator 302. When the client communicator 202 receives the request for a check record transmitted from the server communicator 302, the client communicator 202 outputs information indicating that the check record has been requested to the controller 201. Thus, the controller 201 reads the requested data of the check record from the check database 10 via the data interface 203, and outputs the read data of the check record to the client communicator 202. The client communicator 202 transmits the data of the check record output from the controller 201 to the server communicator 302. When the client communicator 202 receives a request for data of a report and an approval request transmitted from the server communicator 302, the client communicator 202 outputs the data of the report and information indicating that the request for approval is made, to the controller 201. Thus, the controller 201 outputs the data of the report output from the client communicator 202 to the check database 10 via the data interface 203 to store (hold) the data in the check database 10, and outputs the data to the display 204 to display the data on display 204. The controller 201 outputs a result of the approval output from the work approver 205 and information on an instruction of the checking work to be newly performed, to the client communicator 202. The client communicator 202 transmits a result of the approval output from the controller 201 or information on an instruction of the checking work to be newly performed, to the server communicator 302.

The data interface 203 is a storage device controller that controls writing (holding) of the data output from the controller 201 in the check database 10), or reading of the data stored (held) in the check database 10 under control of the controller 201. More specifically, the data interface 203 writes the data of the report output from the controller 201 to the check database 10 to hold the data in the check database 10 under the control of data writing from the controller 201. The data interface 203 reads the data of the check route or the check record stored (held) in the check database 10 under the control of the data reading from the controller 201, and outputs the data of the read check route or check record to the controller 201.

The display 204 is a display that presents various types of information to the manager M operating the check server device 20 by generating and displaying a display screen according to the data output from the controller 201. More specifically, the display 204 generates a display screen according to the data of the report output from the controller 201 and presents the display screen to the manager M. The display 204 includes, for example, a display device such as a liquid crystal display (LCD). The display 204 may be a display device connected to the check server device 20.

The work approver 205 is, for example, a user interface including an input device such as a keyboard, and a pointing device such as a mouse, which receive an operation of approval of the report of the manager M. When the work approver 205 receives an operation of an approval result such as approval or non-approval of the report by an operation of the manager M, the work approver 205 outputs information indicating the received approval result to the controller 201. Thus, the controller 201 outputs information on the approval result output from the work approver 205 to the client communicator 202 to transmit the information to the server communicator 302.

In the check server device 20, various operations regarding the patrol check of the facility arranged in the plant are performed by the manager M. More specifically, the check server device 20 is used not only for an operation of report approval of the manager M, but also for a setting of the check route or an input (creation) of the check record (check list). The check server device 20 is used for the manager M to perform an instruction of redoing of the checking work (re-checking), an instruction of new checking work, and input of instruction content determined from the check list (check record) to which the measured value of the measurement device 41 shown in the report displayed on the display 204 or the check result of the checking work performed by the worker FO has been input, that is, the result of the checking work performed by the worker FO. In the following description, a configuration in which an input operation of an instruction or instruction content other than the operation for inputting the result of report approval to be performed by the manager M is also performed by the work approver 205 will be described. Therefore, the work approver 205 outputs information or data indicating an instruction or instruction content input by the manager M, that is, information or data indicating various instructions or details regarding the patrol check as described above to the controller 201. Thus, the controller 201 outputs information or data indicating an instruction or details output from the work approver 205 (for example, information or data indicating the details of the re-checking or new checking work) to the client communicator 202 to cause the client communicator 202 to transmit the information or the data to the server communicator 302.

With such a configuration, in the patrol check system 1, the check terminal device 30 acquires the check record from the check server device 20 through the communication over the wireless communication network built into the plant. In the patrol check system 1, the data collection device 40 collects the measured value acquired by the associated measurement device 41. In the patrol check system 1, the check terminal device 30 acquires the measured value of the measurement device 41 collected by the data collection device 40, and reflects the measured value in the associated check item of the check list shown in the check record acquired from the check server device 20. Accordingly, the worker FO performing the patrol check while patrolling the inside of the plant can perform only the checking work for which the measured value has not been reflected in the check list in the check point at which the worker FO has arrived.

The patrol check system 1 outputs (transmits) the check record in which the measured value acquired by the measurement device 41 or the check result of the checking work has been input (reflected) as a report to the check server device 20 over the wireless communication network. Accordingly, the manager M who manages the operation (function) of each of the facilities arranged in the plant can immediately confirm the check result of the facility arranged near the position of the current check point at which the worker FO performs the checking work. The manager M can perform an instruction of a new checking work as necessary. After the check result of the performed checking work has been approved by the manager M, the worker FO can efficiently perform the patrol check by going to the next check point. That is, the patrol check system 1 can end the sequence of patrol checking work without the worker FO going to the place in of the facility again and performing the checking work (performing re-checking).

Figure 3:
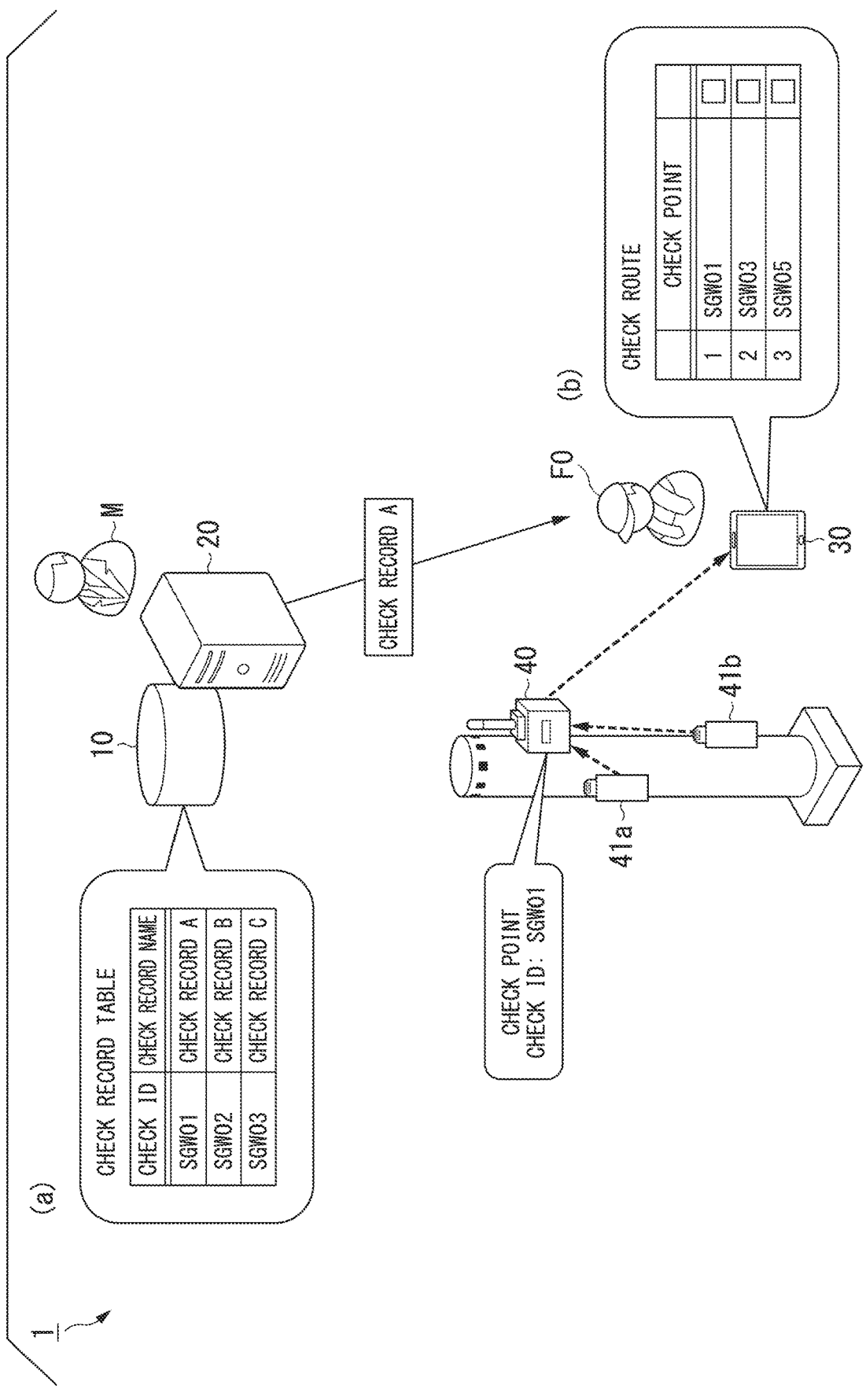
FIG. 3 is a diagram schematically showing an example of a state in which checking work of patrol checking is performed in a plant into which a patrol check system according to the first embodiment is built.

Next, a procedure of the patrol checking work in the plant into which the patrol check system 1 has been built will be described. FIG. 3 is a diagram schematically showing an example of a state in which checking work of patrol checking is performed in the plant into which the patrol check system 1 of the first embodiment is built.

As described above, data of the check record in which a check list indicating the details (item) of the work that is performed on the facility belonging to each check point is summarized is stored in association with each check point installed in the plant in the check database 10. In (a) of FIG. 3, an example of a check record table in which the check ID that is identification information for identifying the check point, and the data of the check record associated with each check point are associated in a format of a table is shown. More specifically, an example of a check record table in which check record name=the check record of the check record A is associated with the check point with check ID=SGW01, check record name=the check record of the check record B is associated with the check point with check ID=SGW02, and check record name=the check record of the check record C is associated with the check point with check ID=SGW03 is shown.

As described above, the worker FO acquires, for example, a check route determined in advance by the manager M from the check server device 20 before starting the patrol check, and patrols the check point installed in the plant while carrying the check terminal device 30 to which the acquired check route has been presented. In (b) of FIG. 3, an example of the check route in which an movement order of the check point installed in the plant is shown is shown. More specifically, an example of the check route in which the worker FO initially (first) goes to the check point with check ID=SGW01, second goes to the check point with Inspection ID=SGW03, and third (last) goes to the check point with check ID=SGW05 is shown. In one example of this check route, when the checking work ends at each check point, that is, when the approval of the report is obtained by the manager M, a check box in which a check mark is described (assigned) is shown in each of the check points.

As described above, when the worker FO arrives at the check point, the worker FO acquires the check record associated with the check point in the current position from the check server device 20. In this case, as described above, in the check terminal device 30, the data (measured value) of the measurement device 41 that belongs to the data collection device 40 is acquired from the data collection device 40 that is each check point. In FIG. 3, a state in which the worker FO arrives at the check point with check ID=SGW01 that is the initial (first) check point, and acquires a checked record A that is a check record associated with the check point with check ID=SGW01 from the check server device 20 is shown. FIG. 3 shows a state in which the measured values of the measurement device 41*a* and the measurement device 41*b* belonging to the data collection device 40 that is a check point with check ID=SGW01 are acquired by the check terminal device 30.

Figure 4:
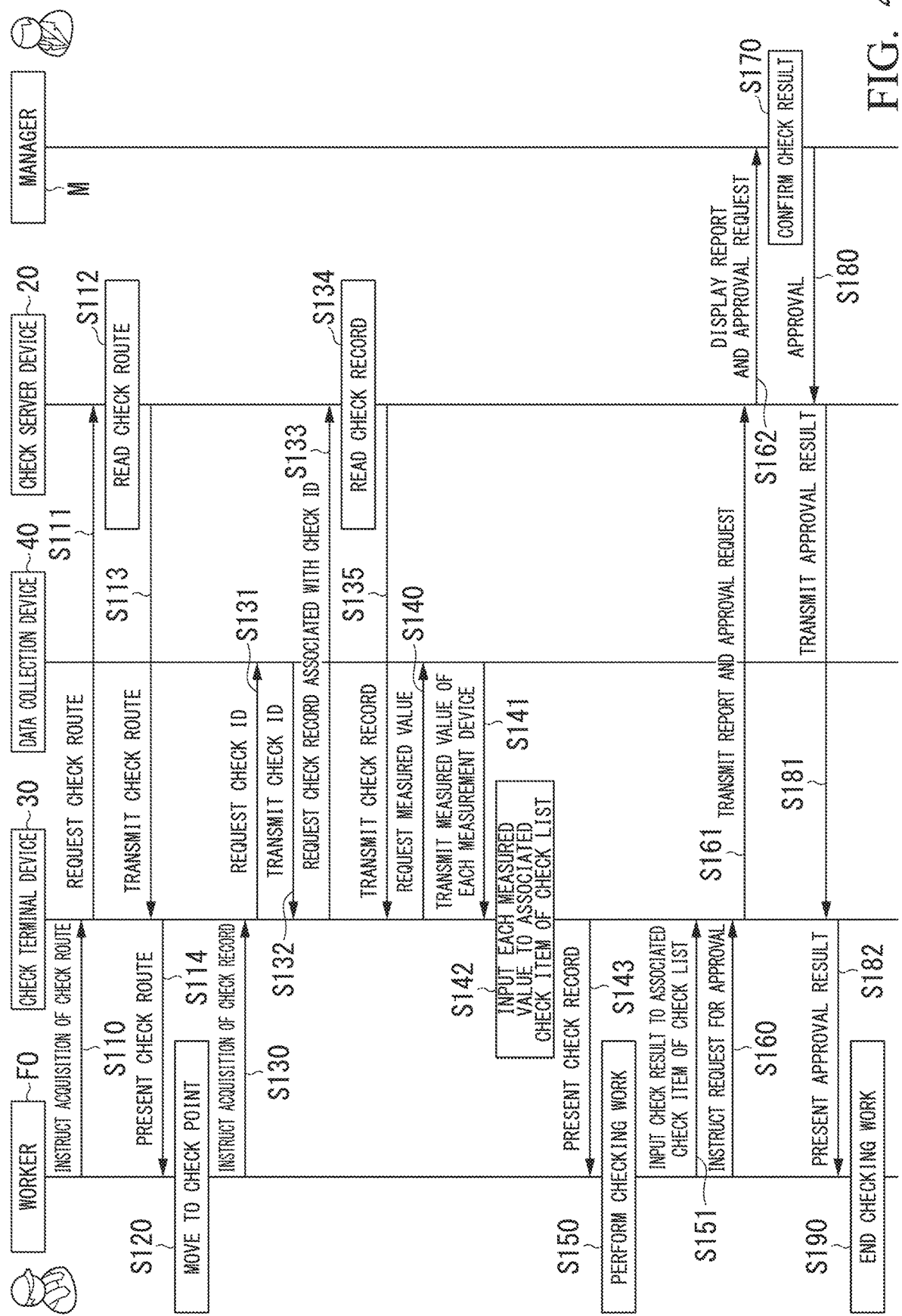
FIG. 4 is a sequence diagram showing a flow of a process and work when checking work of patrol checking is performed in a plant into which the patrol check system of the first embodiment has been built.

A process and a work when checking work of patrol check is performed in the plant into which the patrol check system 1 has been built will be described herein. FIG. 4 is a sequence diagram showing a flow (a process sequence) of the process and the work when the checking work of patrol check is performed in the plant into which the patrol check system 1 of the first embodiment has been built. FIG. 4 shows an example of a flow of a process in each of the check terminal device 30, the data collection device 40, and the check server device 20 constituting the patrol check system 1 that are operated when the worker FO performs the checking work of the patrol check. In FIG. 4, a work of the worker FO performing the checking work in the patrol check, that is, an operation with respect to the check terminal device 30, and a work of the manager M confirming the patrol check report (the check result of the performed checking work at the check point) and performing the approval, that is, an operation with respect to the check server device 20 are shown together.

In the following description, data of the check route, data of the check record, and the like are assumed to have been already stored in the check database 10. In the following description, the check terminal device 30 is assumed to perform the exchange of data or information with the check server device 20 over the wireless communication network built into the plant, and perform exchange of data or information with the data collection device 40 through wireless communication of WiFi (registered trademark) or the like. In the following description, it is assumed that server software (for example, check software) operating as a server device in a client-server type patrol check system 1 is executed in the check server device 20, and a client program (for example, a check program) operating as a client device in the client-server type patrol check system 1 is executed in the check terminal device 30.

First, in a preparation step in the patrol check, before the worker FO starts the patrol check, the worker FO operates the check terminal device 30 to instruct acquisition of a check route (step S110). More specifically, the worker FO operates the work approval requestor 306 included in the check terminal device 30 to instruct to acquire the check route in step S110. Thus, the check terminal device 30 transmits a request for transmission of the check route to the check server device 20 according to the instruction to acquire the check route from the worker FO in step S110 (step S111). More specifically, the controller 301 outputs an instruction signal (control signal) indicating acquiring the instructed check route to the server communicator 302 in step S111. Thus, the server communicator 302 transmits a request for transmission of the check route to the client communicator 202 included in the check server device 20 over the wireless communication network according to the instruction signal to acquire the check route output from the controller 301.

The check server device 20 reads the data of the check route stored (held) in the check database 10 according to the request for transmission of the check route transmitted over the wireless communication network (step S112). The check server device 20 transmits the read data of the check route to the check terminal device 30 (step S113). More specifically, when the client communicator 202 receives the request for transmission of the check route transmitted from the server communicator 302, the client communicator 202 outputs information indicating that the check route has been requested to the controller 201 in step S112. Thus, the controller 201 outputs a control signal for instructing to read the data of the check route stored (held) in the check database 10 to the data interface 203. The data interface 203 searches for the data of the check route stored (held) in the check database 10, reads data matching the requested check route from the check database 10, and outputs the data to the controller 201 under the control of the reading of the check route output from the controller 201. Thus, the controller 201 outputs the data of the check route output from the data interface 203 to the client communicator 202. Thus, the client communicator 202 transmits the data of the check route output from the controller 201 to the server communicator 302 included in the check terminal device 30 over the wireless communication network in step S113.

The check terminal device 30 presents a check route transmitted over the wireless communication network to the worker FO (step S114). More specifically, when the server communicator 302 receives the data of the check route transmitted from the client communicator 202, the server communicator 302 outputs the received data of the check route to the controller 301. Thus, the controller 301 outputs the data of the check route output from the server communicator 302 and a control signal for instructing to display the data of the check route to the display 305. The display 305 generates and displays a display screen according to the data of the check route output from the controller 301 to present the check route transmitted from the check server device 20 over the wireless communication network to the worker FO in step S114. Thus, the worker FO can move (go out) to an initial (first) check point (the check point with check ID=SGW01 in FIG. 3) in a state in which the check route is displayed on the check terminal device 30. The controller 301 outputs the data of the check route output from the server communicator 302 and the control signal for instructing to write data of the check route to the check record data storage 303. The check record data storage 303 stores the data of the check route output from the controller 301 under the control of the writing of the data of the check route output from the controller 301.

Then, the worker FO moves to the check point on the basis of the check route displayed on the check terminal device 30 (step S120).

In the checking work step in the patrol check, the worker FO operates the check terminal device 30 in a position within a communicatable range of the current check point to which the worker FO has moved, and instructs acquisition of the check record (step S130). More specifically, the worker FO operates the work approval requestor 306 included in the check terminal device 30 to instruct the acquisition of the check record in step S130. Thus, the check terminal device 30 transmits a request for transmission of the check ID to the data collection device 40 according to the instruction to acquire the check record from the worker FO in step S130 (step S131). More specifically, the controller 301 outputs an instruction signal (control signal) indicating requesting transmission of the check ID is requested, to the device communicator 304 in step S131. Thus, the device communicator 304 transmits a request for transmission of the check ID to the data collection device 40 through wireless communication according to the instruction signal for requesting the transmission of the check ID output from the controller 301.

When the check terminal device 30 has a configuration for automatically determining that the check terminal device 30 enters a communicatable range in which the check terminal device 30 can transmit and receive data or information to and from the data collection device 40 through wireless communication, the worker FO may not perform an operation of instructing the acquisition of the check record in step S130. In this case, the check terminal device 30 automatically starts the wireless communication with the data collection device 40 to and from which the check terminal device 30 can transmit and receive data or information, in a position within the communicatable range of the current check point to which the worker FO has moved, and transmits the request for transmission of the check ID to the data collection device 40 in step S131.

The data collection device 40 transmits information on its own check ID (check ID=SGW01 in FIG. 3) to the check terminal device 30 through wireless communication according to the request for transmission of the check ID transmitted through the wireless communication (step S132).

When the check terminal device 30 receives the check ID of the data collection device 40 transmitted through wireless communication, the check terminal device 30 transmits a request for transmission of the check record associated with the received check ID to the check server device 20 (step S133). More specifically, when the device communicator 304 receives the check ID of the data collection device 40 transmitted through the wireless communication in step S132, the device communicator 304 outputs information on the received check ID to the controller 301. Thus, the controller 301 outputs the check ID of the data collection device 40 output from the device communicator 304, and an instruction signal (control signal) indicating acquiring the check record associated with the check ID, that is, the check point in the current position to the server communicator 302 in step S133. Thus, the server communicator 302 transmits the check ID and the request for transmission of the check record to the client communicator 202 included in the check server device 20 over the wireless communication network according to the instruction signal to acquire the check record output from the controller 301.

The check server device 20 reads the data of the check record stored (held) in the check database 10 according to the request for transmission of the check record transmitted over the wireless communication network (step S134). The check server device 20 transmits the read data of the check record to the check terminal device 30 (step S135). More specifically, when the client communicator 202 receives the check ID and the request for transmission of the check record transmitted from the server communicator 302, the client communicator 202 outputs information on the check ID and the information indicating the request for the check record to the controller 201 in step S134. Thus, the controller 201 outputs a control signal for instructing to read the data of the check record associated with the check ID stored (held) in the check database 10 to the data interface 203. The data interface 203 searches for the data of the check record associated with the check ID stored (held) in the check database 10 under the control of the reading of the check record output from the controller 201, reads the data matching the requested check record from the check database 10, and outputs the data to the controller 201. Thus, the controller 201 outputs the data of the check record output from the data interface 203 to the client communicator 202. Thus, the client communicator 202 transmits the data of the check record associated with the check ID output from the controller 201 to the server communicator 302 included in the check terminal device 30 over the wireless communication network in step S135. The check terminal device 30 stores the data of the check record transmitted over the wireless communication network in the check record data storage 303. More specifically, when the server communicator 302 receives the data of the check record transmitted from the client communicator 202, the server communicator 302 outputs the received data of the check record in the controller 301. The controller 301 outputs the data of the check record output from the server communicator 302, and a control signal indicating writing of the data of the check record to the check record data storage 303. The check record data storage 303 stores the data of the check record output from the controller 301 under the control of the writing of the data of the check record output from the controller 301.

Subsequently, the check terminal device 30 transmits a request for transmission of data (measured value) of the associated measurement device 41 to the data collection device 40 (step S140). More specifically, the controller 301 outputs an instruction signal (control signal) indicating requesting transmission of the measured value of the measurement device 41 to the device communicator 304 in step S140. Thus, the device communicator 304 transmits the request for transmission of the measured value of the measurement device 41 to the data collection device 40 through the wireless communication according to the instruction signal for requesting transmission of the measured value of the measurement device 41 output from the controller 301.

The data collection device 40 transmits the data of the measured value of each associated measurement device 41 (the measurement device 41a and the measurement device 41b belonging to the data collection device 40 of check point with check ID=SGW01 in FIG. 3) to the check terminal device 30 through wireless communication according to the request for transmission of the measured value of the measurement device 41 received through the wireless communication (step S141).

When the check terminal device 30 receives the data of the measured value of the measurement device 41 that has been transmitted from the data collection device 40 through wireless communication, the check terminal device 30 inputs (reflects) the received data of the measured value of the measurement device 41 to the associated check item of the check list shown in the check record stored in the check record data storage 303 to updates the check record stored in the check record data storage 303 (step S142). More specifically, when the device communicator 304 receives the data of the measured value of each measurement device 41 with which the data collection device 40 is associated, which is transmitted through the wireless communication in step S141, the device communicator 304 outputs the received data of the measured value of each measurement device 41 to the controller 301. Thus, the controller 301 outputs the data of the measured value of each of the measurement device 41, and a control signal indicating the update of the data area of the check result in the item of the checking work in the check list shown in the check record associated with the data of the measured value of the measurement device 41 to the check record data storage 303 in step S142. Thus, the check record data storage 303 stores (updates) the data of the measured value of the measurement device 41 output from the controller 301 in the data area of the check result of the associated check item of the check list shown in the check record on the basis of a device ID that is identification information for identifying the measurement device 41 associated with the data of the measured value of the measurement device 41 under the control of the data update from the controller 301.

Figure 5:
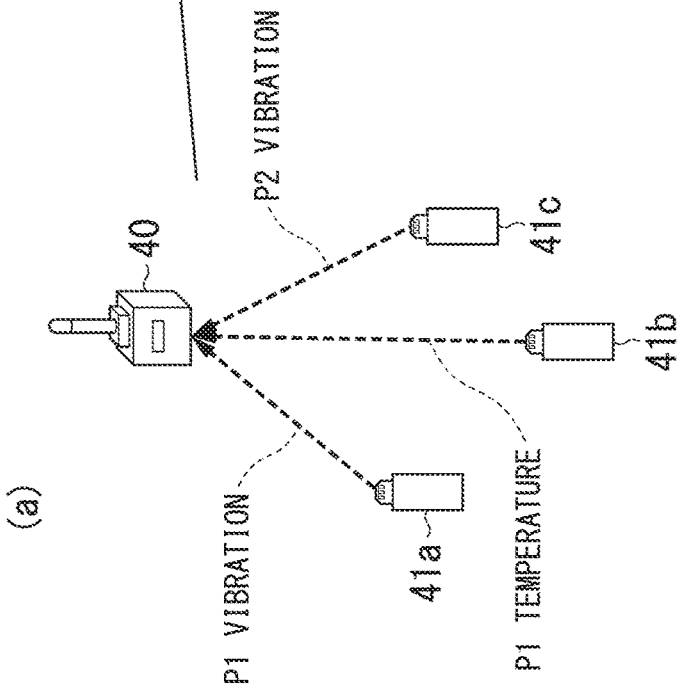
FIG. 5 is a diagram schematically showing an example in which measured values of a measurement device installed in a facility are input to the associated check item of a check list in a plant into which the patrol check system of the first embodiment has been built.

An example of update of the check record in step S142, that is, a process of inputting (reflecting) the data of the measured value of each measurement device 41 received from the data collection device 40 to the associated check item of the check list shown in the check record will be described herein. FIG. 5 is a schematic diagram of an example in which the measured value of the measurement device 41 installed in the facility is input (reflected) to the associated check item of the check list in the plant into which the patrol check system 1 of the first embodiment has been built. In (a) of FIG. 5, a state in which three measurement device 41 including the measurement device 41a, the measurement device 41b, and the measurement device 41c belong to the data collection device 40 that is a check point, and the data collection devices 40 collect the measured value of each measurement device 41 is shown. In (b) of FIG. 5, an example of the check record A that is a check record associated with the check point is shown.

In the patrol check system 1, as described above, the associated check record is associated with the data collection device 40 that is a check point. In FIG. 5, the check record A shown in (b) of FIG. 5 is associated with the data collection device 40 shown in (a) of FIG. 5. In the check record, the data area in which a check result is input to each check item of the check list is provided. In the check record A shown in (b) of FIG. 5, four check items ("P1 vibration confirmation", "P1 temperature confirmation", "P2 vibration confirmation", and "P2 temperature confirmation") to be always performed and one check item ("oil injection") to be performed as necessary are set as check items for the facility=rotation motor M1, and a data area Fv1 to which the measured value is input is provided as a data area of a check result associated with each of the four check items to be always performed. In the check record A shown in (b) of FIG. 5, two check items ("P1 vibration confirmation" and "P1 temperature confirmation") to be always performed and two check items ("screw tightening" and "oil injection") to be performed as necessary are set as check items for the facility=rotation motor M2, and a data area Fv2 to which the measured value is input is provided as a data area of a check result associated with each of the two check items to be always performed. In the check record A shown in (b) of FIG. 5, two check items ("P1 vibration confirmation" and "P1 temperature confirmation") to be always performed are set as check items for the facility=rotation motor M2, and a data area Fv3 to which the measured value is input is provided as a data area of a check result associated with each of the two check items to be always performed. In the example of the check record A shown in (b) of FIG. 5, since respective check items to be performed as necessary are check items that are to be determined on whether it is performed according to the check result of the check items to be always performed in the respective facilities, for example, the items are grayed out to gray and now represented as items for which the work is not performed in the step in which the measured value of the associated check result is not input.

In the patrol check system 1, any one of the measurement devices 41 belonging to the associated data collection device 40 is associated with the data area of the check items that are always performed in each facility. For example, in the example shown in FIG. 5, the measurement device 41a shown in (a) of FIG. 5 is associated with check item="P1 vibration confirmation" in the facility=rotation motor M1 in the check record A shown in (b) of FIG. 5. Thus, in the check terminal device 30, in the process of updating the check record in step S142, the data of the measured value (P1 vibration) of the measurement device 41a is stored (reflected) in the associated position in the data area Fv1 as a check result of check item="P1 vibration confirmation". For example, in the example shown in FIG. 5, the measurement device 41b shown in (a) of FIG. 5 is associated with check item="P1 temperature confirmation" in the facility=rotation motor M1 in the check record A shown in (b) of FIG. 5. Thus, in the check terminal device 30, in the process of updating the check record in step S142, the data of the measured value (P1 temperature) of the measurement device 41b is stored (reflected) in the associated position in the data area Fv1 as a check result of check item="P1 temperature confirmation". For example, in the example shown in FIG. 5, the measurement device 41c shown in (a) of FIG. 5 is associated with check item="P2 vibration confirmation" in the facility=rotation motor M1 in the check record A shown in (b) of FIG. 5. Thus, in the check terminal device 30, in the process of updating the check record in step S142, the data of the measured value (P2 vibration) of the measurement device 41c is stored (reflected) in the associated position in the data area Fv1 as a check result of check item="P2 vibration confirmation". In the example of the check record A shown in (b) of FIG. 5, a state in which measured values of the respective measurement devices 41 are reflected is shown.

In the example of the check record A shown in (b) of FIG. 5, the measurement device 41 is not associated with check item="P2 temperature confirmation" in the facility=rotation motor M1, check item="P1 vibration confirmation" and "P1 temperature confirmation" in the facility=rotation motor M2, and check item="P1 vibration confirmation" and "P1 temperature confirmation" in the facility=rotation motor M3. Therefore, check items with which the measurement device 41 is not associated are items of the checking work that the worker FO is required to perform. That is, these check items are the item that the worker FO is required to actually go to the respective facilities and input measured values.

Referring back to FIG. 4, a continuation of the process sequence of the patrol check system 1 will be described. The check terminal device 30 presents the updated check record to the worker FO (step S143). More specifically, the controller 301 outputs a control signal for instructing to read the data of the updated check record to the check record data storage 303. Thus, the check record data storage 303 outputs the data of the stored check record to the controller 301 under the control of the reading of the check record output from the controller 301. The controller 301 outputs the data of the check record output from the check record data storage 303, and a control signal for instructing to display the data of the check record to the display 305. The display 305 presents the check record (check list) which has been transmitted from the check server device 20 over the wireless communication network and in which the data of the measured value of the measurement device 41 transmitted from the data collection device 40 through the wireless communication has been reflected to the worker FO by generating and displaying a display screen according to the data of the check record output from the controller 301 in step S143. Thus, the worker FO can confirm the checking work required to be performed in the position of the current check point by confirming (check list) the check record displayed on the check terminal device 30.

Then, the worker FO performs the checking work required to be performed on the basis of the check record (check list) displayed on the check terminal device 30 (step S150). The worker FO inputs the check result of the performed checking work to the associated check item of the check list shown in the check record (step S151). More specifically, the worker FO goes to the facility of which the checking work is required to be performed and operates, for example, components for check (not shown) included in the check terminal device 30 or uses a measurement device which has been separately carried to perform the checking work in step S150. The worker FO operates the work approval requestor 306 included in the check terminal device 30 to select the data area of the check result of the item of the checking work in the check list shown in the check record associated with the performed checking work, and inputs the check result of the checking work in step S151. When the check result of the checking work is input by the work approval requestor 306 in step S151, the controller 301 outputs the information on the selected data area of the check result, the data of the input check result, and a control signal indicating updating the data area of the check result to the check record data storage 303, similar to the process of step S142. Thus, the check record data storage 303 stores (updates) the data of the check result of the checking work output from the controller 301 in the selected data area of the check result of the item of the checking work output from the controller 301 in the check list shown in the check record under the control of the data update from the controller 301. The controller 301 outputs a control signal for instructing to read the data of the updated check record to the check record data storage 303, and outputs a control signal for instructing to display the data of the check record output from the check record data storage 303 to the display 305, similar to the process of step S143. Accordingly, the check terminal device 30 presents the updated check record to the worker FO.

The worker FO performs all checking work required to be performed, that is, repeats the process and the work in steps S150 and S151 on the basis of the check record (check list) displayed on the check terminal device 30. Thus, the data of the measured value of the measurement device 41 or the data of the check result of the checking work performed by the worker FO is reflected in all check items in the check record (check list) displayed on the check terminal device 30. The worker FO does not have to perform the process and the work of steps S150 and S151 when it is confirmed that there is no checking work required to be performed in the position of the current check point as a result of confirming the check record (the check list) in which the data of the measured value of the measurement device 41 has been reflected, which has been presented in step S143.

Then, in the approval step of in the patrol check, the worker FO instructs a request for approval of the report when the data of the measured value of the measurement device 41 or the data of the check result of the performed checking work by the worker FO has been reflected in all check items of the check record (check list) displayed on the check terminal device 30, that is, when the worker FO ends the checking work at the check point in the current position (step S160). More specifically, the worker FO operates the work approval requestor 306 included in the check terminal device 30 and instructs the request for approval in step S160. Thus, the check terminal device 30 transmits the report, and the request for approval for the report to the check server device 20 according to the instruction of the request for approval from the worker FO in step S160 (step S161). More specifically, the controller 301 outputs a control signal for instructing to read the data of the stored check record as a report to the check record data storage 303 in step S161. Thus, the check record data storage 303 outputs the data of the stored check record to the controller 301 under control of reading of the check record (report) output from the controller 301. The controller 301 outputs the data of the check record (report) output from the check record data storage 303 and an instruction signal (control signal) indicating requesting a request for approval of the data of the check record (report) to the server communicator 302. Thus, the server communicator 302 transmits the data of the check record (report) and the request for approval to the client communicator 202 included in the check server device 20 over the wireless communication network according to the instruction signal for requesting the request for approval output from the controller 301.

The check server device 20 presents the report and the request for approval to the manager M according to the request for approval transmitted over the wireless communication network (step S162). More specifically, when the client communicator 202 receives the data of the report and the request for approval transmitted from the server communicator 302, the client communicator 202 outputs the report and information indicating that there has been the request for approval of the report to the controller 201. Thus, the controller 201 outputs the data of the report output from the client communicator 202 and a control signal indicating writing of the data of this report to the data interface 203. The data interface 203 stores (holds) the data of the report output from the controller 201 in the check database 10 under the control of the writing of the report output from the controller 201. The controller 201 outputs the data of the report output from the client communicator 202 and a control signal for instructing to display information indicating the data of the report and the request for approval to the display 204. The display 204 presents the report transmitted from the check terminal device 30 over the wireless communication network to the manager M by generating and displaying the display screen according to the data of the report and the information on the request for approval output from the controller 201 in step S162.

Then, the manager M confirms the content of the report displayed in the check server device 20, that is, the check result of the checking work in the position of the current check point performed by the worker FO (step S170). More specifically, the manager M determines whether or not it is necessary to perform re-checking, whether or not there is checking work required to be newly performed, or whether or not the result of the checking work is approved in step S170.

The manager M inputs the approval result for the request for approval of the report on the basis of the content of the report displayed in the check server device 20 (step S180). More specifically, the manager M operates the work approver 205 included in the check server device 20 to input the approval result for the report in step S180. Thus, the check server device 20 transmits the information on the approval result of the report to the check terminal device 30 (step S181). More specifically, the controller 201 outputs the information on the approval result of the report input by the work approver 205 to the client communicator 202 in step S180. Thus, the client communicator 202 transmits the information on the approval result output from the controller 201 to the server communicator 302 included in the check terminal device 30 over the wireless communication network in step S181.

The check terminal device 30 presents the information of the approval result transmitted over the wireless communication network to the worker FO (step S182) More specifically, when the server communicator 302 receives the information on the approval result transmitted from the client communicator 202, the server communicator 302 outputs the information on the received approval result to the controller 301. The controller 301 outputs information on the approval result output from the server communicator 302 and a control signal for instructing to display the information on the approval result to the display 305. Accordingly, the check terminal device 30 presents the approval result for the report from the manager M to the worker FO. Thus, the worker FO can confirm the approval result for the report displayed on the check terminal device 30 to confirm whether or not the result of the checking work performed in the position of the current check point has been approved, whether or not the re-checking has been instructed, or whether or not checking work to be performed newly has been instructed.

When the result of the performed checking work is not approved as a result of approving the report displayed on the check terminal device 30 and the re-checking or the new checking is instructed, the worker FO returns to the checking work step in the patrol check and performs the instruction checking work. That is, the worker FO performs the process and the work in steps S150 and S151. The worker FO performs an instruction of the request for approval for the report in step S160 again in the approval step in the patrol check, and confirms the approval result presented in step S182. When the result of the performed checking work has not been approved again, the worker FO returns to the checking work step in the patrol check again, performs the process and the work of step S150, step S151, and steps S160 again, and performs the process and the work of the approval step in the patrol check again. That is, the worker FO repeats the process and the work of steps S150 to S182 in the patrol check system 1.

Figure 6:
FIG. 6 is a diagram schematically showing an example of a check list for instructing maintenance work according to a result of performing checking work of patrol checking in a plant into which the patrol check system of the first embodiment has been built.

An example of the approval result for the report will be described. FIG. 6 is a diagram schematically showing an example of a check list for instructing maintenance work according to the result of performing the checking work of patrol check in the plant into which the patrol check system 1 of the first embodiment has been built. An example of a check list (check record) shown in FIG. 6 is an example of a case in which performing check of one check item to be performed as necessary is instructed on the basis of the check results of four check items to be always performed on facility=rotation motor M1 in the check record A shown in (b) of FIG. 5.

The manager M confirms content of the report displayed (step S162) on the display 204 included in the check server device 20, that is, the check record to which the check result of the checking work in the position of the current check point performed by the worker FO has been input (reflected) in step S170. In the check record A shown in FIG. 6, the manager M confirms each measured value input (reflected) in the data area Fv1 of the check result associated with each of four check items always performed on the facility=rotation motor M1. The manager M is assumed to have determined that there is the checking work (maintenance work) that is required to be newly performed from each measured value. In this case, the manager M operates the work approver 205 included in the check server device 20 and changes the checking work area Fw1 of check item="oil injection" set as the check item to be performed on facility=rotation motor M1 as necessary into a state in which the worker FO is instructed to perform new maintenance work and, for example, a state in which the graying-out is released in step S180. Thus, the check server device 20 transmits the check record A changed by the manager M to the check terminal device 30 as information on the approval result of the report including the information indicating instructing to perform new maintenance work in step S181, and the check terminal device 30 presents the information on the transmitted approval result to the worker FO in step S182.

A method by which the manager M instructs a re-checking or new checking work may be a method of instructing the re-checking or new checking work using information (for example, a document) or data (for example, a new check record) indicating the details of the re-checking or new checking work, in addition to a method of releasing graying-out of the associated check item as described above.

The worker FO confirms that check item="oil injection" for facility=rotation motor M1 has been instructed from the state of the checking work area Fw1 of the check record A shown as the approval result for the report in the check terminal device 30, and performs a maintenance work for injecting oil into the rotation motor M1 in step S150. The worker FO inputs the check result for the performed checking work (maintenance work) in step S151. For example, the worker FO inputs a check mark to the check box shown in the data area in the checking work area Fw1 in the check record A shown in FIG. 6. The worker FO performs the request of approval of the report to which the worker FO inputs the check result of the performed checking work (maintenance work) again in step S160.

A method by which the worker FO inputs the check result of the checking work (maintenance work) performed in step S151 is not limited to the method of inputting the check mark to the check box as described above. For example, it is conceivable that the check terminal device 30 includes a function of a camera for performing imaging (hereinafter referred to as a "camera function"). In this case, states before and after a work target place in the facility subjected to the checking work (maintenance work) are imaged together with a subject serving as a reference using the camera function, and an image thereof may be associated with the report as a result of performing the checking work (maintenance work). In this case, the check server device 20 may be configured to determine the result of performing the checking work (maintenance work) through image recognition for a difference between the work target places reflected in the images before and after the checking work (maintenance work) associated with the report.

For example, when the check item of the checking work (maintenance work) is "oil injection", a state in which oil comes out at an oil injection place is recognized through image recognition for images before and after the oil injection, and an state in which the oil has been injected may be determined. For example, when the check item of the checking work (maintenance work) is "screw tightening", the angle of a tool hole of a screw head may be recognized through image recognition for images before and after tightening of the screws, and a rotational state of the tightened screw (a state in which the screw is tightened) may be determined. For example, when the check item of the checking work (maintenance work) is "corrosion confirmation", spread of corrosion in the corrosion place may be recognized through image recognition for a current image of a target place and an image of the same target place imaged in previous checking work (maintenance work), and a state in which the corrosion has progressed may be determined.

Thus, information other than the measured value acquired by the measurement device 41 can also be associated with the check record (report). That is, as in the measured value acquired by the measurement device 41 or the worker FO, information other than information which can represent the operation state of the facility as a value (numerical value) can be associated with the check record (report) and can be used to determine the result of the checking work. When a result of the checking work (maintenance work) can be represented as numerical values though image recognition for images before and after the checking work (maintenance work), a result of the checking work (maintenance work) may be determined on the basis of the numerical value.

Referring back to FIG. 4, a continuation of the process sequence of the patrol check system 1 will be described. When the result of the performed checking work has been approved as a result of approving the report displayed on the check terminal device 30 in step S182, the worker FO ends the checking work in the position of the current check point (step S190). The worker FO moves (goes) to the next check point (the check point with check ID=SGW03 in FIG. 3) on the basis of the check route displayed on the check terminal device 30 and similarly performs the checking work in a position within the communicatable range of the current check point to which the worker FO has moved. That is, the worker FO repeats the process and the work of steps S120 to S190 (the process and the work of the checking work step and the approval step of in the patrol check) in the patrol check system 1 shown in FIG. 4 until the worker FO completes the checking work at all the check points shown in the check route displayed on the check terminal device 30.

Through a flow (process sequence) of such a process and work, in the patrol check system 1, the worker FO carries the check terminal device 30 and sequentially moves to the respective check points installed in the plant, and performs a sequence of patrol checking work while obtaining the approval of the check result of the manager M.

Figure 7:
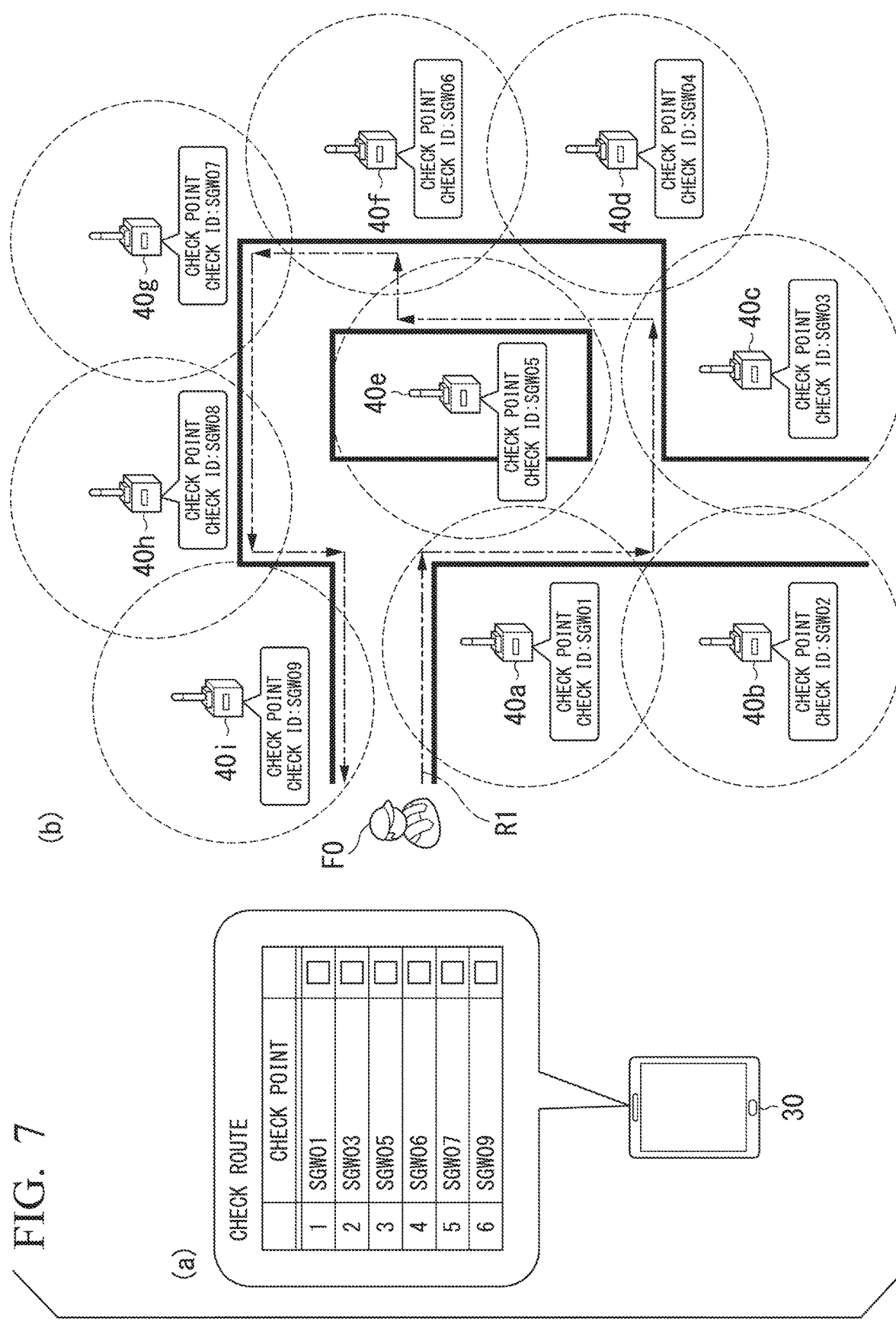
FIG. 7 is a diagram schematically showing an example of a route of movement when checking work of patrol checking is performed in a plant into which the patrol check system of the first embodiment has been built.

A route along which the worker FO patrols the check points installed in the plant in patrol checking will be described herein. FIG. 7 is a diagram schematically showing an example of a route of movement (a route of movement of the worker FO) when checking work of patrol check is performed in a plant into which the patrol check system 1 of the first embodiment has been built. In (a) of FIG. 7, an example of the check route that the worker FO has acquired before starting the patrol check using the check terminal device 30 is shown. In (b) of FIG. 7, a map of a plant into which the patrol check system 1 has been built and a position of the data collection device 40 installed in the plant, that is, the check point are schematically shown. In (b) of FIG. 7, a communicatable range in which each data collection device 40 can perform transmission and reception of data or information to and from the check terminal device 30 through wireless communication is schematically shown.

As described above, the worker FO moves into a communicatable range of the check point on the basis of the check route displayed on the check terminal device 30, and performs checking work in a position within the communicatable range of the respective check points. For example, in an example shown in FIG. 7, the worker FO moves to a position within a communicatable range of each check point in an order of SGW01, SGW03, SGW05, SGW06, SGW07, and SGW09 on the basis of the check route shown in (a) of FIG. 7. In (b) of FIG. 7, a movement route R1 is shown as an example of a movement route of the worker FO at this time.

The worker FO can acquire the measured value of the measurement devices 41 belonging to the data collection device 40 by moving into the communicatable range of the data collection device 40 installed as each check point. For example, the worker FO can acquire the measured value of the measurement devices 41 belonging to the data collection device 40a by moving (entering) into the communicatable range of the data collection device 40a installed as the check point with check ID=SGW01. For example, the worker FO can acquire the measured value of the measurement devices 41 belonging to the data collection device 40c by moving (entering) into the communicatable range of the data collection device 40c installed as the check point with check ID=SGW03. Similarly, the worker FO can acquire the measured values of the measurement devices 41 belonging to the respective data collection devices 40 by moving (entering) into the communicatable range of the data collection device 40d to the data collection device 40i installed as check points with check ID=SGW05, SGW06, SGW07, and SGW09. That is, only by the worker FO moving into the communicatable range of each data collection device 40, the measured values associated with all check items of the check list shown in the check record can be input (reflected), and the checking work for the facility belonging to the data collection device 40 can be ended.

The worker FO obtains approval of the report for each check point, as described above. Thus, in the plant into which the patrol check system 1 has been built, when the worker FO moves, for example, along a movement route R1 shown in (b) of FIG. 7, a sequence of patrol checking work ends for the respective facilities belonging to the check points shown in the check route.

In the movement route R1 shown in FIG. 7, the worker also moves into the communicatable range of the data collection device 40h installed as a check point with check ID=SGW08, but the check point with check ID=SGW08 is not included as the check point in the check route shown in (a) of FIG. 7. Therefore, the worker FO does not acquire the measured value of the measurement device 41 belonging to the data collection device 40h, and moves into the communicatable range of the data collection device 40i installed as a check point with next check ID=SGW09 without obtaining the approval of the report.

As described above, for a facility in which the measured value of the measurement device 41 belonging to the data collection device 40 is not acquired at each check point, the worker needs to actually go to a place in the facility, perform checking work, and input the measured value. That is, for a facility in which the measurement device 41 has not been installed in advance, the worker FO needs to go to the facility that is a check target out of the movement route R1 as shown in (b) of FIG. 7, and the checking work by the worker FO work is necessary. Therefore, in some plants, the worker FO cannot necessarily complete the checking work for all the facilities only by moving to the communicatable range of the data collection device 40. However, in the plant, in a state in which the measurement device 41 installed in a predetermined position of the facility is added and the associated measured value is reflected in all the items of the check list shown in the check record, it is possible to complete the checking work for all the facilities only by moving to within the communicatable range of the data collection device 40 since the worker FO does not have to actually go to the place in the facility except when the instruction of work such as re-checking and maintenance work is issued.

Figure 8:
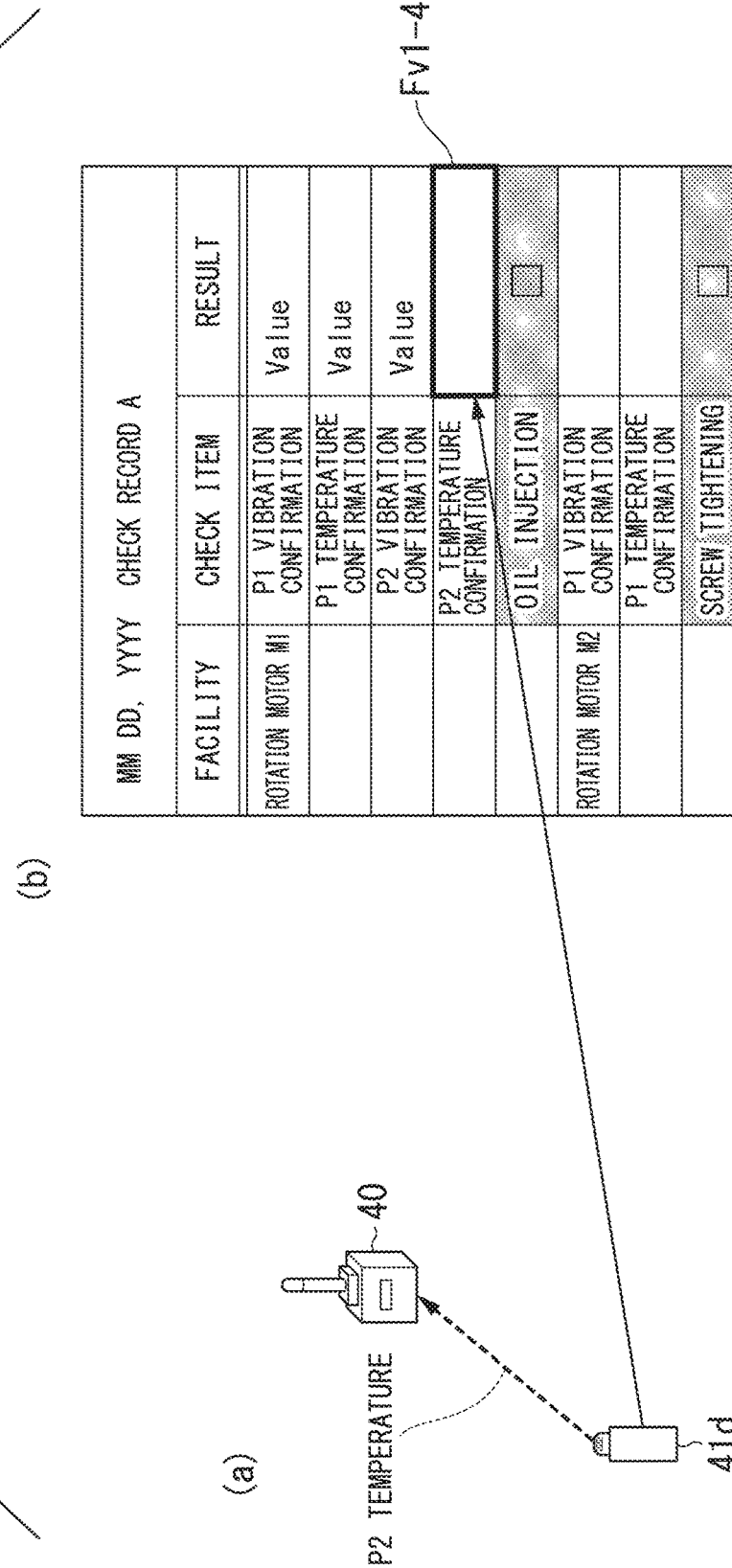
FIG. 8 is a diagram schematically showing an example in which a measurement device is associated with a check list in a plant into which the patrol check system of the first embodiment has been built.

Next, a process and work when the added measurement device 41 is associated with the check item of the check list shown in the check record in a case in which the measurement device 41 is added in the plant into which the patrol check system 1 has been built will be described. FIG. 8 is a diagram schematically showing an example in which the measurement device 41 is associated with the check list in the plant into which the patrol check system 1 of the first embodiment has been built. (a) of FIG. 8 shows a state in which the measurement device 41d is added in a predetermined position of the facility arranged in a predetermined range (area) around the data collection device 40 installed as a check point. (b) of FIG. 8 shows a check item of the check record A with which the added measurement device 41d is associated.

An example in which the measurement device 41 shown in FIG. 8 is associated with the check list is an example of a case in which a newly installed measurement device 41d is associated with check item="P2 temperature confirmation" of facility=rotation motor M1 with which the measurement device 41 is not associated, in the check record A shown in (b) of FIG. 5. The worker performing a work of associating the measurement device 41 with the check list (in the following description, this worker is also assumed to be the "worker FO") can associate the added measurement device 41d belonging to the data collection device 40 with the check item="P2 temperature confirmation" by specifying (selecting) the data area Fv1-4 in the check record (check list) displayed on the check terminal device 30. Thus, the check terminal device 30 carried by the worker FO then performing the checking work at the check point at which the data collection device 40 has been installed stores (reflects) the data of the measured value (P2 temperature) of the measurement device 41d in the position of the data area Fv1-4 as the result of check of check item="P2 temperature confirmation" in the process of updating the check record in step S142 shown in FIG. 4. Accordingly, check item="P2 temperature confirmation" in facility=rotation motor M1 is an item that the worker FO going to the actual facility does not have to measure.

A case in which the work for associating the measurement device 41 with the check list is performed in a position within the communicatable range of the data collection device 40 and a case in which the work for associating the measurement device 41 with the check list is performed in a position in which the measurement device 41 is actually installed are conceivable. For example, when the measurement device 41 has already been added and the worker FO has (recognizes) information on the added measurement device 41, the worker FO can perform the work for associating the measurement device 41 with the check list in a position within the communicatable range of the data collection device 40. For example, when the worker performs a work of installing (adding) the measurement device 41 in the facility, a work for associating the measurement device 41 with the check list can be simultaneously performed in the position in which the measurement device 41 is actually installed (added).

<First Association Work>

Figure 9:
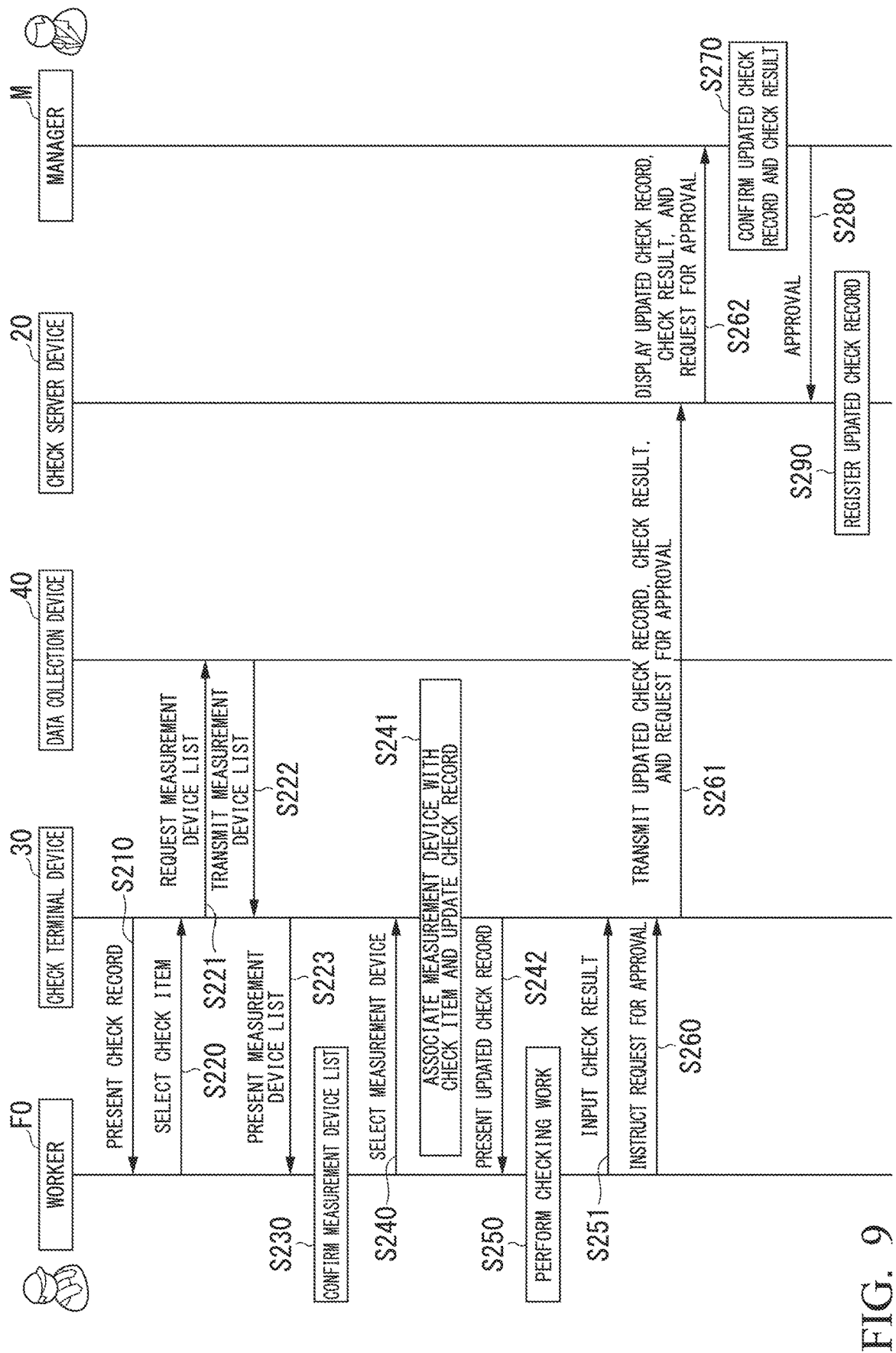
FIG. 9 is a sequence diagram showing a process and workflow when first association work for associating a measurement device with a check list is performed in a plant into which the patrol check system of the first embodiment has been built.

A process and a work when association working for associating the added measurement device 41 with the check list is performed in the plant into which the patrol check system 1 has been built will be described herein. FIG. 9 is a sequence diagram showing a flow of a process and work when a first association work for associating the measurement device 41 with the check list is performed in the plant into which the patrol check system 1 of the first embodiment has been built. The first association work is a work in which when the measurement device 41 has already been added and the worker FO has (recognizes) information on the added measurement device 41 (information such as a name or a model number exclusively set in the measurement device 41 installed in the plant), the worker FO associates the added measurement device 41 with the check list in a position within the communicatable range of the data collection device 40.

FIG. 9 shows an example of a flow of a process in each of the check terminal device 30, the data collection device 40, and the check server device 20 constituting the patrol check system 1 that is operated when the worker FO performs the first association work for associating the measurement device 41 to the check list. In FIG. 9, a work of the worker FO performing the first association work, that is, an operation with respect to the check terminal device 30 and a work of the manager M ascertaining the check list with which the measurement device 41 has been associated (the checked record updated through the first association work) and performing approval, that is, an operation with respect to the check server device 20 are shown together. In the following description, the data of the check record before the first association work is performed is assumed to have been already stored in the check terminal device 30. In the following description, the check terminal device 30 is assumed to perform exchange of data or information with the check server device 20 over the wireless communication network built into the plant, and perform exchange of data or information with the data collection device 40 over wireless communication such as WiFi (registered trademark).

First, the worker FO carries the check terminal device 30 in which the check record that is a target with which the added measurement device 41 is associated is stored, and moves to the communicatable range of the check point at which the data collection device 40 to which the added measurement device 41 belongs has been installed. The worker FO operates the check terminal device 30 to instruct presentation of the check record in a position within the communicatable range of the current check point to which the worker FO has moved. Thus, the check terminal device 30 present the stored check record (the check record before the first association operation is performed) to the worker FO (step S210). More specifically, the worker FO operates the work approval requestor 306 included in the check terminal device 30, and instructs presentation of the check record. Thus, the controller 301 outputs a control signal for instructing to read the data of the stored check record to the check record data storage 303. The check record data storage 303 outputs the data of the stored check record to the controller 301 under the control of the reading of the check record output from the controller 301. The controller 301 outputs the data of the check record output from the check record data storage 303, and a control signal for instructing to display the data of the check record to the display 305. The display 305 presents the check record (the check list) to the worker FO by generating and displaying a display screen according to the data of the check record output from the controller 301 in step S210.

When the check terminal device 30 has a configuration for automatically determining that the check terminal device 30 enters a communicatable range in which the check terminal device 30 can transmit and receive data or information to and from the data collection device 40 through wireless communication, the worker FO may not perform an operation of instructing to present the check record. In this case, the check terminal device 30 automatically starts the wireless communication with the data collection device 40 to and from which the check terminal device 30 can transmit and receive data or information, in a position within the communicatable range of the current check point to which the worker FO has moved, and presents the check record (the check list) to the worker FO in step S210.

Then, the worker FO starts the first association work of associating the added measurement device 41 with the check record (check list) displayed on the check terminal device 30. When the first association work is started, the worker FO selects the check item that is a target with which the measurement device 41 is associated, in the check record (check list) displayed on the check terminal device 30 (step S220). More specifically, the worker FO operates the work approval requestor 306 included in the check terminal device 30 to select (designate) an area of the check item that is a target with which the measurement device 41 is associated in the check list shown in the check record in step S220. For example, the worker FO selects (designates) an area of check item="P2 Temperature confirmation" in the check record A or an area of the data area Fv1-4 shown in (b) of FIG. 8. Thus, the check terminal device 30 transmits a request for transmission of a list of measurement devices 41 which are incorporated in the data collection device 40 (hereinafter, referred to as a "measurement device list") to the data collection device 40 according to the selection of the check item from the worker FO in step S220 (step S221). More specifically, the controller 301 outputs an instruction signal (control signal) indicating requesting transmission of the measurement device list to the device communicator 304 in step S221. Thus, the device communicator 304 transmits a request for transmission of the measurement device list to the data collection device 40 through wireless communication according to an instruction signal for requesting the transmission of the measurement device list output from the controller 301.

The data collection device 40 transmits information on the list (measurement device list) of measurement devices 41 belonging to the data collection device 40 to the check terminal device 30 through wireless communication according to the request for transmission of the measurement device list transmitted through the wireless communication (step S222). Information such a name or a model number exclusively set in the measurement device 41 installed in the plant is shown in the measurement device list that the data collection device 40 transmits to the check terminal device 30 through wireless communication. In the measurement device list, a device ID that is identification information for identifying the measurement device 41 is also included and correlated with the information such as the name or the model number exclusively set in the measurement device 41.

When the check terminal device 30 receives the measurement device list of the data collection device 40 transmitted through the wireless communication, the check terminal device 30 presents the received measurement device list to the worker FO (step S223). More specifically, when the device communicator 304 receives the measurement device list of the measurement device 41 belonging to the data collection device 40 transmitted through the wireless communication in step S223, the device communicator 304 outputs data of the received measurement device list to the controller 301. Thus, the controller 301 outputs the data of the measurement device list output from the device communicator 304, and a control signal for instructing to display the data of the measurement device list to the display 305. The display 305 presents the measurement device list transmitted from the data collection device 40 through the wireless communication, to the worker FO by generating and displaying a display screen according to the data of the measurement device list output from the controller 301 in step S223. The measurement device list that the check terminal device 30 presents to the worker FO may be only information such as a name or a model number exclusively set in the measurement device 41 installed in the plant. That is, the check terminal device 30 may not present the associated device ID in the measurement device list transmitted from the data collection device 40 to the worker FO.

Then, the worker FO confirms the measurement device list displayed on the check terminal device 30 (step S230). More specifically, the worker FO confirms whether or not the measurement device 41 associated with the check item selected in step S220 is included, that is, the added measurement device 41 associated with the check record (check list) is listed in step S230. When the measurement device 41 associated with the check item is included, the worker FO selects the added measurement device 41 listed on the measurement device list (step S240). More specifically, the worker FO operates the work approval requestor 306 included in the check terminal device 30 to select the area of the added measurement device 41 shown in the measurement device list in step S240. For example, in the measurement device list, an area shown in the measurement device 41*d* shown in (a) of FIG. 8 is selected.

The check terminal device 30 associates the measurement device 41 selected by the worker FO with the associated check item of the check list shown in the check record stored in the check record data storage 303 to update the check record stored in the check record data storage 303 (step S241). More specifically, the controller 301 outputs the information on the device ID associated with the measurement device 41 selected in step S240 and the information on the check item selected in step S220, and a control signal indicating associating the device ID with the check item of the check list shown in the check record to update the check record to the check record data storage 303. Thus, the check record data storage 303 stores (updates) information on the device ID output from the controller 301 in the device ID association area of the check item designated from the controller 301 in the check list shown in the check record under the control of the device ID updating from the controller 301. Thus, for example, the measurement device 41*d* shown in (a) of FIG. 8 is stored in the device ID association area of check item="P2 temperature confirmation" in the check record A shown in (b) of FIG. 8, and the check record A is updated. When the checking work has then been performed at the check point at which the data collection device 40 has been installed, the data of the measured value (P2 temperature) of the measurement device 41*d* is stored (reflected) in the position of the data area Fv1-4 as the check result of check item="P2 temperature confirmation" in the process of updating the check record A in step S142 shown in FIG. 4 in the check terminal device 30 carried by the worker FO.

The check terminal device 30 presents the updated check record to the worker FO (step S242). More specifically, the controller 301 outputs a control signal for instructing to read the data of the updated check record to the check record data storage 303. Thus, the check record data storage 303 outputs data of the stored check record to the controller 301 under the control of the reading of the check record output from the controller 301. The controller 301 outputs the data of the check record output from the check record data storage 303 and a control signal for instructing to display the data of the check record to the display 305. The display 305 presents the updated check record (the check list) to the worker FO by generating and displaying a display screen according to the data of the check record output from the controller 301 in step S242.

Then, the worker FO performs the checking work using the measurement device 41 associated with the check record on the basis of the updated check record (check list) displayed on the check terminal device 30 (step S250). The worker FO inputs the check result of the performed checking work to the associated check item of the check list shown on the updated check record (step S251). The process of the checking work using the associated measurement device 41 in the worker FO, and the input of the check result is the same as steps S150 and S151 shown in FIG. 4. The process of the checking work by the worker FO in steps S250 and S251 and the input of the check result may be a process in which the check terminal device 30 requests the transmission of the data (measured value) of the associated measurement device 41 and reflects the data in the updated check record in which the measured value of the measurement device 41 has been updated, as in steps S140 to S143 of FIG. 4.

Then, when the update of the check items in the check record (check list) associated with the measurement device 41 added to the data collection device 40 in the current position of the check point has all ended, the worker FO instructs the request for approval of updated check record (check list) (step S260). More specifically, the worker FO operates the work approval requestor 306 included in the check terminal device 30 and instructs the request for approval in step S160. Thus, the check terminal device 30 transmits the updated check record, the check result of the checking work using each associated measurement device 41 and the request for approval for the updated check record to the check server device 20 according to the instruction of the request for approval from the worker FO in step S260 (step S161). More specifically, the controller 301 outputs a control signal for instructing to read the data of the stored check record as the updated check record to the check record data storage 303 in step S261. Thus, the check record data storage 303 outputs the data of the stored check record to the controller 301 under control of reading of the updated check record output from the controller 301. The check result of the checking work using the associated measurement device 41 is included in the data of this check record. The controller 301 outputs the data of the updated check record output from the check record data storage 303 and an instruction signal (control signal) indicating requesting the request for approval of the data of the updated check record to the server communicator 302. Thus, the server communicator 302 transmits the data of the updated check record and the request for approval to the client communicator 202 included in the check server device 20 over the wireless communication network according to the instruction signal for requesting the request for approval output from the controller 301.

The check server device 20 presents the updated check record and the request for approval to the manager M according to the request for approval transmitted over the wireless communication network (step S262). More specifically, when the client communicator 202 receives the data of the updated check record transmitted from the server communicator 302 and the request for approval, the client communicator 202 outputs the updated check record, and information indicating that there is the request for approval of the updated check record to the controller 201. Thus, the controller 201 outputs the data of the updated check record output from the client communicator 202, and a control signal for instructing to display the data of the updated check record and information indicating the request for approval to the display 204. The display 204 presents the updated check record transmitted from the check terminal device 30 over the wireless communication network to the manager M by generating and displaying a display screen according to the data of the updated check record and the information on the request for approval output from the controller 301 in step S262.

Then, the manager M confirms the updated check record displayed on the check server device 20, and the check result of the checking work using the associated measurement device 41 reflected in the updated check record (step S270). More specifically, the manager M determines whether or not the check result reflected in the updated check record is the check result of the performed checking work by the correctly associated measurement device 41 in step S270.

The manager M inputs the approval result for the approval request of the updated check record on the basis of the updated check record displayed on the check server device 20 and the check result (step S280). More specifically, the manager M operates the work approver 205 included in the check server device 20 and inputs the approval result for the updated check record in step S280.

When the manager M inputs the approval result indicating approving the updated check record in step S280, the check server device 20 registers (updates) the data of the check record stored (held) in the check database 10 (step S290). More specifically, the controller 201 outputs the data of the updated check record output from the client communicator 202 and presented to the manager M by the display 204, and a control signal to instruct to write the data of the updated check record to the data interface 203. The data interface 203 stores (holds) the data of the updated check record output from the controller 201 in check database 10 under the control of the writing of the updated check record output from the controller 201 in step S290.

In the patrol check system 1, the approval result for the updated check record by the manager M is presented to the worker FO, similar to steps S181 and S182 shown in FIG. 4. Thus, the worker FO can confirm the approval result for the updated check record displayed on the check terminal device 30 to confirm whether or not the first association work for associating the added measurement device 41 with the check list has been completed. When the approval result for the updated check record displayed on the check terminal device 30 indicates non-approval, the worker FO may perform the first association work again. That is, the worker FO may repeat the first association work shown in FIG. 9 (more specifically, a working of steps S220 to S260 and confirmation of the approval result for the updated check record).

Through a flow (process sequence) of such a process and work, in the first association work in the patrol check system 1, the worker FO carries the check terminal device 30 and goes to the check point at which the data collection device 40 to which the added measurement devices 41 belongs is installed to update the check record, and obtains approval of the updated check record from the manager M to last update the check record. The first association work in the patrol check system 1 can also be performed when the worker FO patrols each check point for patrol check.

<Second Association Work>

Figure 10:
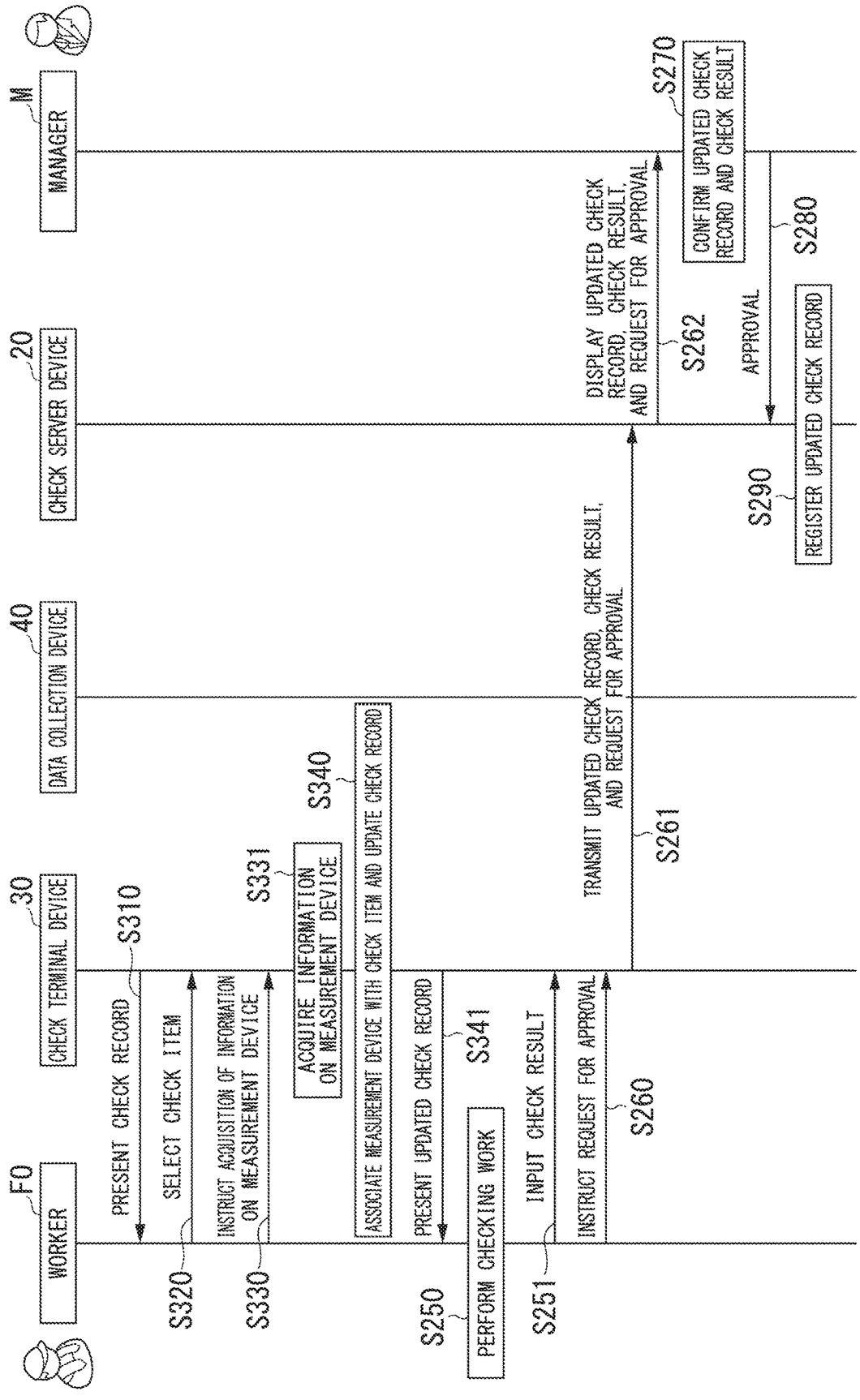
FIG. 10 is a sequence diagram showing a process and workflow when second association work for associating a measurement device with a check list is performed in a plant into which the patrol check system of the first embodiment has been built.

Next, another process and work when an association work for associating an added measurement device 41 with the check list is performed in the plant into which the patrol check system 1 has been built will be described. FIG. 10 is a sequence diagram showing a flow of a process and work when a second association work for associating the measurement device 41 with the check list is performed in the plant into which the patrol check system 1 of the first embodiment has been built. The second association work is a work in a case in which a work for associating the measurement device 41 with the check list is simultaneously performed in a position in which the measurement device 41 is actually installed (added) when a work for installing (adding) the measurement device 41 in the facility is performed.

FIG. 10 shows an example of a flow of a process in each of the check terminal device 30, the data collection device 40, and the check server device 20 constituting the patrol check system 1 that is operated when the worker FO performs the second association work for associating the measurement device 41 to the check list, similar to the sequence diagram of the first association work shown in FIG. 9. In FIG. 10, a work of the worker FO performing the second association work, that is, an operation with respect to the check terminal device 30 and a work of the manager M ascertaining the check list with which the measurement device 41 has been associated (the checked record updated through the second association work) and performing approval, that is, an operation with respect to the check server device 20 are shown together, similar to the sequence diagram of the first association work shown in FIG. 9. In the following description, the data of the check record before the second association work is performed is assumed to have been already stored in the check terminal device 30, similar to the sequence diagram of the first association work shown in FIG. 9. In the following description, the check terminal device 30 is assumed to perform exchange of data or information with the check server device 20 over the wireless communication network built into the plant, similar to the sequence diagram of the first association work shown in FIG. 9.

First, the worker FO carries the check terminal device 30 in which the check record that is a target with which the measurement device 41 to be added is associated is stored, and moves to a position of the facility in which the measurement device 41 is installed (added). The worker FO installs (adds) the measurement device 41. Then, the worker FO operates the check terminal device 30 to instruct the presentation of the check record at a current position, that is, the position in which the measurement device 41 has been installed (added). Thus, the check terminal device 30 presents the stored check record (the check record prior to the second association work) to the worker FO (step S310). A process in which the check terminal device 30 presents the stored check record (the check record prior to the second association work) to the worker FO according to the instruction of the worker FO in step S210 is the same as the process of step S210 in the first association work shown in FIG. 9. Therefore, when the check terminal device 30 is configured to automatically determine that the check terminal device 30 enters a communicatable range that the check terminal device 30 can transmit and receive data or information to and from the data collection device 40 through wireless communication such as WiFi (Registered trademark), the wireless communication has already been automatically started when the worker FO arrives in the position in which the worker FO installs (adds) the measurement device 41). Even when the worker FO does not perform an operation of instructing presentation of the check record, the check record (check list) prior to the second association work has already been presented.

Then, the worker FO starts the second association work for associating the measurement device 41 installed (added) in the current position with the check record (check list) displayed on the check terminal device 30. When the worker FO starts the second association work, the worker FO selects (designates) the check item that is a target with which the added measurement device 41 is associated in the check record (check list) displayed on the check terminal device 30 (step S320). The operation of the check terminal device 30 that the worker FO performs when selecting (designating) the check item that is a target with which the added measurement device 41 is associated in step S320 is the same as the operation in step S320 in the first association work shown in FIG. 9.

The worker FO operates the check terminal device 30 to instruct the acquisition of the information on the added measurement device 41 (step S330). Thus, the check terminal device 30 acquires information from the measurement device 41 according to the instruction to acquire the information of the measurement device 41 from the worker FO in step S330 (step S331). More specifically, the worker FO operates the work approval requestor 306 included in the check terminal device 30 and instructs to acquire information such as the device ID of the measurement device 41 in step S330. The device ID of the measurement device 41, for example, can be acquired from a short-range wireless communication tag such as an NFC tag included in the measurement device 41. In this case, the worker FO instructs execution of a short-range wireless communication function of the NFC included in the check terminal device 30 in step S330. Thus, the check terminal device 30 acquires a device ID registered in the NFC tag included in the measurement device 41 using the short-range wireless communication function of the NFC in step S331. The device ID of the measurement device 41, for example, can be acquired from the information registered in a two-dimensional code such as a Quick Response (QR) code (registered trademark) affixed to the measurement device 41. In this case, the worker FO instructs the execution of a function of reading the QR code (registered trademark) included in the check terminal device 30 in step S330. Thus, the check terminal device 30 acquires the device ID of the measurement device 41 using the function of reading the QR code (registered trademark) in step S331. By connecting the check terminal device 30 and the measurement device 41, for example, using a wired interface such as a USB (registered trademark), the check terminal device 30 may acquire the device ID of the measurement device 41.

The check terminal device 30 associates the measurement device 41 with the acquired device ID with the associated check item of the check list shown in the check record stored in the check record data storage 303 to update the check record stored in the check record data storage 303 (step S340). More specifically, the controller 301 outputs information on the device ID acquired from the measurement device 41 added in step S331, the information on the check item selected in step S320, and a control signal indicating associating the device ID with the check item in the check list shown in the check record to update the check record to the check record data storage 303. Thus, check record data storage 303 stores (updates) information on the device ID output from the controller 301 in the device ID association area of the check item designated from the controller 301 in the check list shown in the check record under the control of the device ID update from the controller 301. Thus, similar to the process of step S241 in the first association work shown in FIG. 9, for example, the measurement device 41d shown in (a) of FIG. 8 is stored in the device ID association area of check item="P2 temperature confirmation" in the check record A shown in (b) of FIG. 8, and the check record A is updated. In the updated check record A, the data of the measured value (P2 temperature) of the measurement device 41d is stored (reflected) in the position of the data area Fv1-4 as the check result of check item="P2 temperature confirmation" in the process of updating the check record A of step S142 shown in FIG. 4 that is executed in the check terminal device 30 when the check terminal device 30 carried by the worker FO enters the communicatable range of the data collection device 40 in the subsequent patrol check.

The check terminal device 30 presents the updated check record to the worker FO (step S341). The process in which the check terminal device 30 presents the updated check record to the worker FO in step S310 is the same as the process of step S242 in the first association work shown in FIG. 9.

Then, the worker FO performs the checking work using the measurement device 41 associated with the check record to input the check result to the check item on the basis of the updated check record (check list) displayed on the check terminal device 30. The worker FO installs (adds) all the measurement devices 41 in the facility and acquires approval for the updated check record (check list) from the manager M. When the manager M approves the updated check record, the check server device 20 stores (holds) the data of the updated check record in the check database 10. The process is the same as the first association work shown in FIG. 9. Therefore, in the sequence diagram of the second association work shown in FIG. 10, a process from the checking work according to the updated check record (check list) by the worker FO to obtaining of the approval of the updated check record (check list) from the manager M) or a process of storing the data of the check record updated by the check server device 20 in the check database 10 is denoted with the same step number as that in the sequence diagram of the first association work shown in FIG. 9 is shown. Accordingly, a detailed description of the processes of steps S250 to S290 in the second association work shown in FIG. 10 will be omitted.

Through a flow (process sequence) of such a process and work, in the second association work in the patrol check system 1, the worker FO simultaneously performs updating the check record when performing a work for installing (adding) the measurement device 41 for the facility, and obtains approval of the updated check record from the manager M to last update the check record.

As described above, in the patrol check system 1 of the first embodiment, the check terminal device 30 acquires the check record from the check server device 20. In the patrol check system 1 of the first embodiment, the data collection device 40 collects the measured value acquired by the associated measurement device 41. In the patrol check system 1 of the first embodiment, the check terminal device 30 acquires the measured value of the measurement device 41 collected by the data collection device 40 and reflects the measured value in the associated check item of the check list shown in the check record. Thus, in the patrol check system 1 of the first embodiment, the worker FO performing the patrol check while carrying the check terminal device 30 and patrolling the inside of the plant can confirm the check record (the check list) in which the measured value of the measurement device 41 has already been reflected, at the check point at which the worker has arrives. Thus, in the patrol check system 1 of the first embodiment, the worker FO can perform only the checking work for which the measured value of the measurement device 41 is not reflected in the check record (the check list).

In the patrol check system 1 of the first embodiment, the check terminal device 30 outputs (transmits) the check record in which the measured value acquired by the measurement device 41 or the check result of the checking work has been input (reflected) as a report to the check server device 20. In the patrol check system 1 of the first embodiment, the check server device 20 presents the report output (transmitted) from the check terminal device 30, for example, to the manager M waiting in an office or the like. That is, in the patrol check system 1 of the first embodiment, the worker FO patrols the inside of the plant and performs the checking work while obtaining the approval of the checking work for the facilities belonging to the respective check point. Thus, in the patrol check system 1 of the first embodiment, the manager M can immediately confirm the check result of the facility belonging to the check point in the current position in which there is the worker FO, and can perform an instruction of a new checking work, as necessary. In the patrol check system 1 of the first embodiment, the worker FO obtains approval of the manager M for the check result of the performed checking work, and therefore, it is possible to improve reliability of the checking work performed at the check point in the current position. In the patrol check system 1 of the first embodiment, the worker FO goes to the place in the facility once subjected to the checking work again to perform re-checking by going to the next check point after the check result of the performed checking work is approved by the manager M. Thus, it is possible to eliminate factors increasing time required for the checking work, and efficiently perform a sequence of patrol checking work.

In the patrol check system 1 of the first embodiment, the check terminal device 30 acquires the device ID from the added measurement device 41, and associates the acquired device ID with the check item of the check record to update the check record. Thus, in the patrol check system 1 of the first embodiment, in the subsequent patrol check, the measured value of the added measurement device 41 is reflected in the associated check item of the check list shown in the check record. Thus, in the patrol check system 1 of the first embodiment, the number of items of checking work in which the measured value of the measurement device 41 is not reflected in the check record (check list) is small, and it is possible to complete a series of patrol checks only by the worker FO patrolling the inside of the plant since there is no check item to be actually performed by the worker FO except when the instruction of work such as re-checking and maintenance work is issued in a case in which the measurement device 41 has been associated with all the check items of the check record.

In the patrol check system 1 of the first embodiment, the check terminal device 30 also outputs (transmits) the updated check record to the check server device 20 to obtain approval of the manager M. Thus, in the patrol check system 1 of the first embodiment, it is possible to improve reliability of the updated check record.

Figure 11:
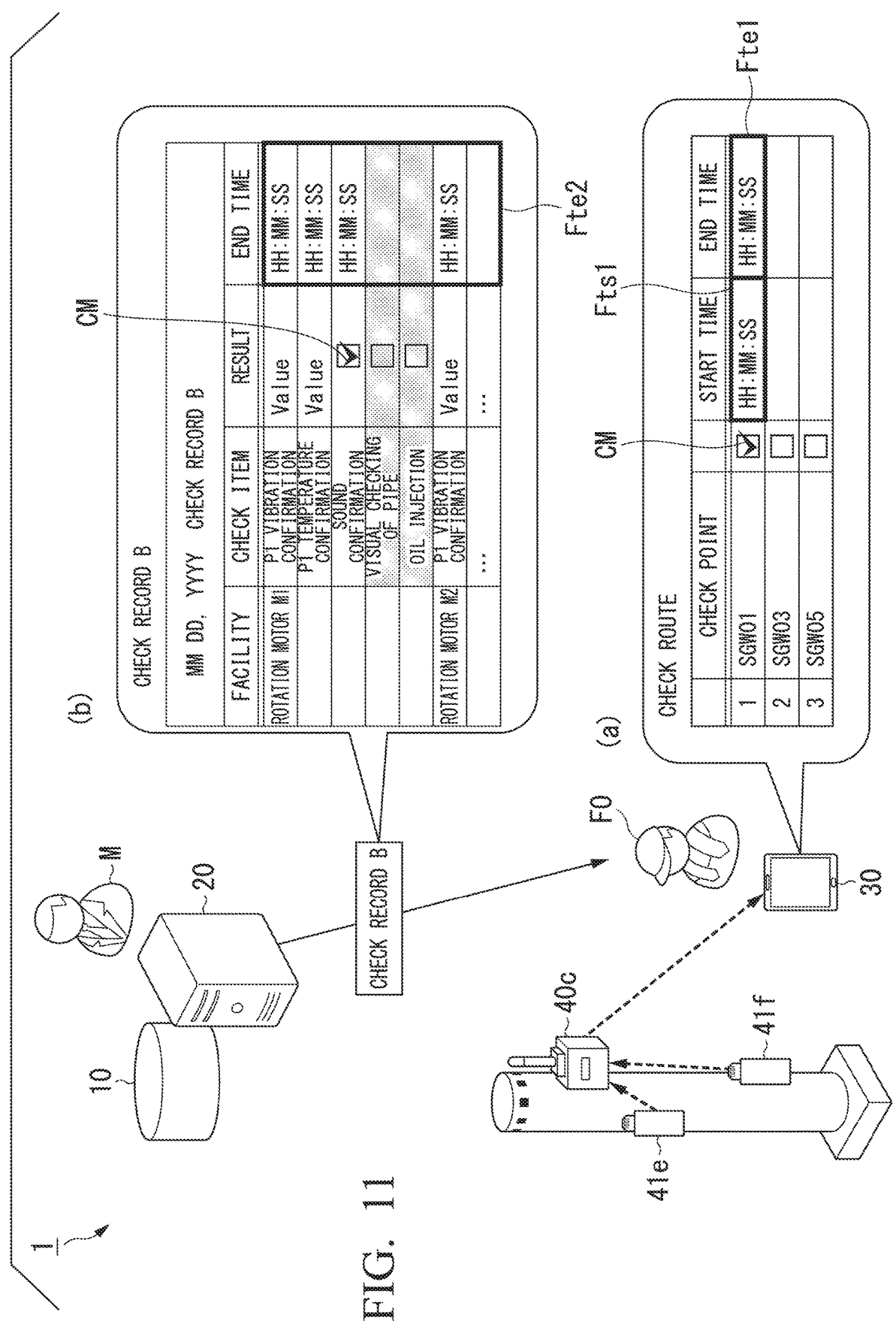
FIG. 11 is a schematic diagram showing another example of a check route and a check list with which the checking work of patrol checking is performed in a plant into which the patrol check system of the first embodiment has been built.

In the patrol check system 1 of the first embodiment, an example of the check route is shown in (b) of FIG. 3 or (a) of FIG. 7, and an example of the check record is shown in (b) of FIG. 5, FIG. 6, and (b) of FIG. 8. However, a format of the check route or the check record is not limited to the format shown above. An example of another format of the check route or the check record will be described. FIG. 11 is a schematic diagram showing another example of the check route and the check list with which the checking work of the patrol check is performed in the plant into which the patrol check system 1 of the first embodiment has been built. In FIG. 11, an example of a state in which the checking work at the initial (first) check point ends and the worker goes to the second check point to perform the checking work is schematically shown.

In (a) of FIG. 11, an example of the check route showing an order of movement along the check point installed in the plant is shown. More specifically, the check route shown in (a) of FIG. 11 shows that the worker initially (first) goes to the check point with check ID=SGW01, second goes to the check point with check ID=SGW03, and third (last) goes to the check point with check ID=SGW05, and shows a checkbox in which a check mark is described (applied) when the checking work ends at each check point. In the check route shown in (a) of FIG. 11, items of "start time" in which time in which the checking work has been started at each check point is described, and "start time" in which time in which the checking work has been ended is described are provided.

In the check route shown in (a) of FIG. 11, when the checking work in the position of the check point with check ID=SGW01 initially (first) performed by the worker FO ends, and the report is approved by the manager M, a check mark CM is described (applied) in the check box associated with the check point with check ID=SGW01. Thus, the worker FO can confirm that the worker FO may move to the next check point (in (a) of FIG. 11, the check point with check ID=SGW03) on the basis of the check route displayed on the check terminal device 30 since the checking work in the position of the current check point (check ID=SGW01) ends.

In the check route shown in (a) of FIG. 11, time in which the checking work has started is described (applied) in the data area Fts1 of "start time" associated with the check point with check ID=SGW01, and time in which the checking work has ended is described (applied) in the data area Fte1 of "end time" associated with the check point with check ID=SGW01. For example, time in which the worker FO has entered the communicatable range of the check point with check ID=SGW01 or time in which the worker FO has performed an operation of instructing the acquisition of the check record in a position in a communicatable range of the check point with check ID=SGW01 (step S130 in the patrol check system 1 shown in FIG. 4) can be considered as the time to be described (applied) in the data area Fts1. For example, time in which the manager M has approved the report of the check point with check ID=SGW01 (step S180 in the patrol check system 1 shown in FIG. 4) is considered as the time described (applied) in the data area Fte1.

In (b) of FIG. 11, an example of the check record B that is a check record associated with the check point with check ID=SGW03 when two measurement devices 41 including the measurement device 41e and the measurement device 41f belong to the data collection device 40c that is a check point with check ID=SGW03, and the data collection device 40c collects the measured value of each measurement device 41 is shown. In the check record B shown in (b) of FIG. 11, an item of "facility" indicating the facility that is a check target, "check item" indicated by the checking work to be performed for each facility, and "result" indicating the result of the checking work performed on each facility are shown. In the check record B shown in (b) of FIG. 11, the item of "end time" in which the time in which the checking work of each check item has ended is described is provided.

In the check record B shown in (b) of FIG. 11, a time in which the checking work of each check item has ended is described (applied) in the data area Fte2 of "end time". In the check record B shown in (b) of FIG. 11, the measured value that the data collection device 40c has collected from each measurement device 41 is reflected in two check items ("P1 vibration confirmation" and "P1 Temperature confirmation") of the check to be always performed on facility=rotation motor M1, and one check item ("P1 vibration confirmation") of the check to be always performed on facility=rotation motor M2. Therefore, in the data area Fte2, for example, time in which each measurement device 41 has performed the measurement, time in which the data collection device 40c has collected the measured value from each measurement device 41, or time in which the check terminal device 30 has input (reflected) the data of the measured value of each measurement device 41 transmitted from the data collection device 40c to the associated check item (step S142 in the patrol check system 1 shown in FIG. 4) can be considered as the end time of the check item to be always performed in the facility.

In the check record B shown in (b) of FIG. 11, three check items ("sound confirmation", "visual checking of a pipe", and "oil injection") of the check to be performed on facility=rotation motor M1, as necessary, is a maintenance work to be newly performed by the worker FO according to an instruction from the manager M. Therefore, in the data area Fte2, for example, a time in which the worker ends the maintenance work and inputs a check mark CM to the item of the check result or a time in which the manager M approves the report showing end of the maintenance work (step S180 in the patrol check system 1 shown in FIG. 4) can be considered as the end time of the check item of the checking work to be performed as necessary in the facility.

By adding the time information to each item as in the check route shown in (a) of FIG. 11 or the check record B shown in (b) of FIG. 11, the worker FO can recognize time required for the checking work or time required for the checking work at each of the check points, or the like, and can use the recognized time to prepare measures for shortening the time required for a sequence of patrol checking work or to improve the patrol checking work.

In the example of the check route or the check record shown in FIG. 11, the case that the item of the start time or the end time has been added is shown, but a format of adding the information of the time is limited to the format shown in FIG. 11. For example, the respective check items in the check record may have such a format that histories of time in respective steps such as a history of time when re-checking has been performed, a history of time when the approval request has been made, or a history of time when the approval result has been obtained can be recorded.

In the patrol check system 1 of the first embodiment, an example of the check route showing a movement order along the check points installed in the plant is shown, as shown in (b) of FIG. 3 or (a) of FIG. 7. However, a format of a patrol route (route) shown in the check route is not limited to the format shown above. For example, the format may be a format of the check route map indicating a patrol route of the respective check points on the map in the plant. When the check terminal device 30 includes, for example, a Global Positioning System (GPS) function (hereinafter, referred to as a "GPS function") of receiving a GPS signal from a GPS satellite and acquiring information on a position, a current position of the check terminal device 30 acquired using the GPS function may be shown on the check route map.

A patrol route shown in the check route map may be determined, for example, on the basis of the information on a movement route acquired by a GPS function when a (skilled) worker experiencing much work patrols a check point in the plant in a previous patrol checking work. By doing so, a worker who does not experience a lot of work can easily patrol the check points in the same route as that for a skilled worker by patrolling the check points according to check route map, and it is possible to more efficiently perform a sequence of patrol checking work.

In the patrol check system 1 of the first embodiment, the case in which the check terminal device 30 and the check server device 20 are configured as a client-server type system has been described. However, the check server device 20 may be a cloud server device included in a cloud computing system, as described above. That is, as described above, the patrol check system 1 may be configured as a web application type system using the check terminal device 30 and the check server device 20.

Second Embodiment

Next, a second embodiment of the present invention will be described. The patrol check system (hereinafter referred to as a "patrol check system 2") of the second embodiment is a check system in which a worker FO goes to a check point and performs checking work, patrols the inside of a plant while obtaining the approval of the manager M of a result of the checking work, and performs a sequence of patrol checking work, similar to the patrol check system 1 of the first embodiment. Therefore, components constituting the patrol check system 2 also includes the same components as the components constituting the patrol check system 1 of the first embodiment shown in FIG. 1. Therefore, in the following description, in the patrol check system 2 of the second embodiment, the same components as those of the patrol check system 1 of the first embodiment are denoted with the same reference numerals, and a detailed description of the components will be omitted.

Figure 12:
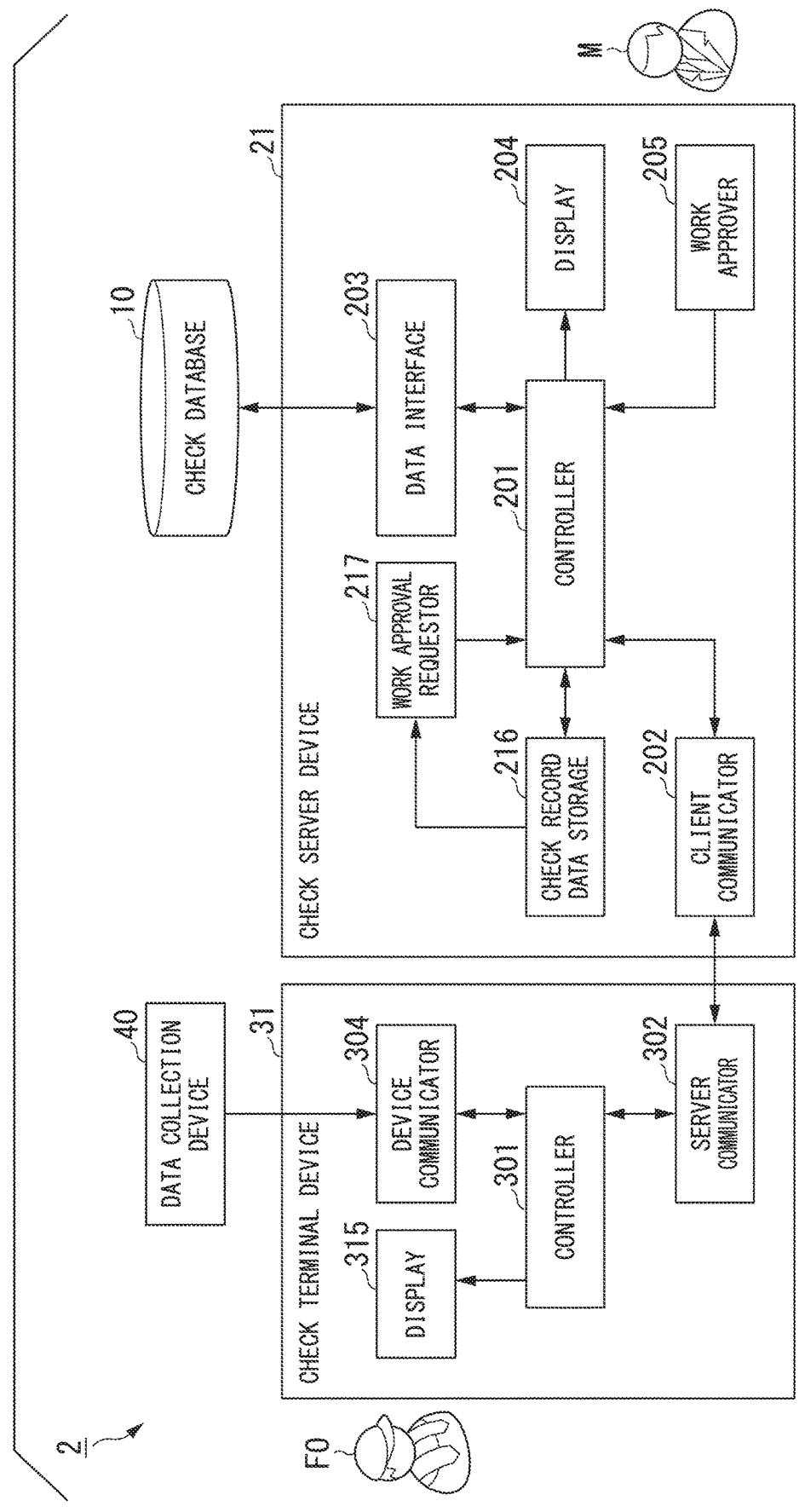
FIG. 12 is a block diagram showing a schematic configuration of a check server device and a check terminal device constituting a patrol check system in a second embodiment of the present invention.

FIG. 12 is a block diagram showing a schematic configuration of the check server device and check terminal device constituting the patrol check system 2 in the second embodiment of the present invention. As shown in FIG. 12, in the patrol check system 2, the check server device 20 constituting the patrol check system 1 of the first embodiment shown in FIGS. 1 and 2 is replaced with a check server device 21, and the check terminal device 30 is replaced with a check terminal device 31. In FIG. 12, the check database 10 and the data collection device 40 constituting the patrol check system 2 are shown together. In the patrol check system 2, the check database 10 and the data collection device 40 are the same as those in the patrol check system 1 of the first embodiment shown in FIGS. 1 and 2.

The check server device 21 includes a controller 201, a client communicator 202, a data interface 203, a display 204, a work approver 205, a check record data storage 216, and a work approval requestor 217. The check terminal device 31 includes a controller 301, a server communicator 302, a device communicator 304, and a display 315.

As shown in FIG. 12, in the patrol check system 2, the check record data storage 303 and the work approval requestor 306 included in the check terminal device 30 constituting the patrol check system 1 of the first embodiment are included in the check server device 21 as the check record data storage 216 and the work approval requestor 217. In other words, in the patrol check system 2, the check record data storage 303 and the work approval requestor 306 included in the check terminal device 30 constituting the patrol check system 1 of the first embodiment are moved to the check server device 21. In the check terminal device 31, the display 305 is replaced with the display 315.

In the patrol check system 2, other components are the same as the corresponding components constituting the patrol check system 1 of the first embodiment shown in FIG. 2. Therefore, in the following description, in the components constituting the patrol check system 2 of the second embodiment, components associated with the components constituting the patrol check system 1 of the first embodiment are denoted with the same reference signs, a detailed description of functions of the respective components will be omitted, and only a different operation due to the movement of the components included in the check terminal device 30 to the check server device 21 will be described.

First, in the check terminal device 31, components with which the components included in the check terminal device 30 constituting the patrol check system 1 of the first embodiment are replaced will be described.

The display 315 presents various types of information to the worker FO carried by the check terminal device 31 by generating and displaying the display screen according to the data output from the controller 301, similar to the display 305 included in the check terminal device 30 constituting the patrol check system 1 of the first embodiment. The display 315 receives various operations of the worker FO in place of the work approval requestor 306 included in the check terminal device 30 constituting the patrol check system 1 of the first embodiment. That is, the display 315 includes a function of the display 305 and the work approval requestor 306 included in the check terminal device 30 constituting the patrol check system 1 of the first embodiment. The display 315 in the check terminal device 31 is configured, for example, as a touch panel in which a display device such as a liquid crystal display that displays a text or an image and a detection device that detects various touch operations such as tapping or flicking of the worker FO using a pressure sensor are combined. The display 315 displays the display screen on the display device, detects an operation that the worker FO has performed with respect to the display screen using the detection device, and outputs the information indicating the detected operation to the controller 301. For example, when the display 315 detects a touch operation for requesting the request for approval of the report from the worker FO, the display 315 outputs the information indicating that the request for approval report has been made to the controller 301. The display 315 is not limited to the configuration as the touch panel in which the display device and the detection device are combined and may include, for example, a display device and an input device such as buttons or switches.

Subsequently, components in the check server device 21 added to the check server device 20 constituting the patrol check system 1 of the first embodiment will be described.

The check record data storage 216 is a data storage device that stores the data output from the controller 201 or outputs the stored data to the controller 201 under the control of the controller 201, similar to the check record data storage 303 included in the check terminal device 30 constituting the patrol check system 1 of the first embodiment. More specifically, the check record data storage 216 stores the check route output from the controller 201 or the data of the check record under control of data writing from the controller 201. The check record data storage 216 stores (updates) the data of the measured value of the measurement device 41 or the data of the check result of the checking work performed by the worker FO transmitted from the check terminal device 31 and output from the controller 201 in the data area of the check result included in the data of the stored check record (the data area of the check result of the item of the checking work designated from the controller 201 in the check list shown in the check record) under the control of the data update from the controller 201. The check record data storage 216 outputs the stored data (such as the data of the check route or the data of the check record) to the controller 201 under the control of the data reading from the controller 201.

The check record data storage 216 may have a configuration such as a DRAM for temporarily storing (holding) data output from the controller 201 under the control of the controller 201, similar to the check record data storage 303 included in the check terminal device 30 constituting the patrol check system 1 of the first embodiment.

The work approval requestor 217 is a determination unit that monitors the data of the check record stored in the check record data storage 216, and determines whether or not the request for approval of the check record as a report is received. The work approval requestor 217 determines that the request for approval of the check record as a report may be received when the data of the measured value of the measurement device 41 or the data of the check result of the checking work is stored (updated) in the data area of all check results included in the data of the check record stored in the check record data storage 216. The work approval requestor 217 outputs a notification signal indicating the determined state of the check record to the controller 201. In the check server device 21, the controller 201 regards that there is the request for approval and performs the process when the notification signal output from the work approval requestor 217 indicates the state in which the request for approval of the check record as a report may be received, and information indicating that the request for report approval has been made by the worker FO has been transmitted from check terminal device 31.

With such a configuration, in the patrol check system 2, the same process as that in the patrol check system 1 of the first embodiment is realized by a web application type system configuration. More specifically, in the patrol check system 2, the check terminal device 31 displays the check record transmitted from the check server device 21 through the communication over the wireless communication network built into the plant, on the display 315. In the patrol check system 2, the data collection device 40 collects the measured value acquired by the associated measurement device 41. In the patrol check system 2, the check terminal device 31 acquires the measured value of the measurement device 41 collected by the data collection device 40, and outputs (transmits) the acquired measured value of the measurement device 41 to the check server device 21 over the wireless communication network. The check server device 21 reflects the measured value of measurement devices 41 output (transmitted) from the check terminal device 31 in the associated check item of the check list shown in the check record stored in the check record data storage 216. The check server device 21 outputs (transmits) the check record in which the measured value of the measurement device 41 has been reflected to the check terminal device 31 over the wireless communication network. The check terminal device 31 presents the check record in which the measured value of the measurement device 41 has been reflected, to the worker FO by displaying the check record output (transmitted) from the check server device 21 on the display 315. Thus, the worker FO patrolling the inside of the plant and performing the patrol check can perform only checking work of which the measured value is not reflected in the check list at the check point at which the worker FO has arrived, similar to the patrol check system 1 of the first embodiment.

The patrol check system 2 presents the check record in which the measured value acquired by the measurement device 41 or the check result of the checking work has been input (reflected), which is stored in the check record data storage 216, as a report to the manager M. Thus, the manager M can immediately confirm the check result of the facility arranged around the position of the current check point at which the worker FO is performing the checking work, and perform the instruction of a new checking work as necessary, similar to the patrol check system 1 of the first embodiment. In the patrol check system 2, the worker FO can efficiently perform a sequence of patrol checking work by going to the next check point after the check result of the performed checking work is approved by the manager M, similar to the patrol check system 1 of the first embodiment.

Figure 13:
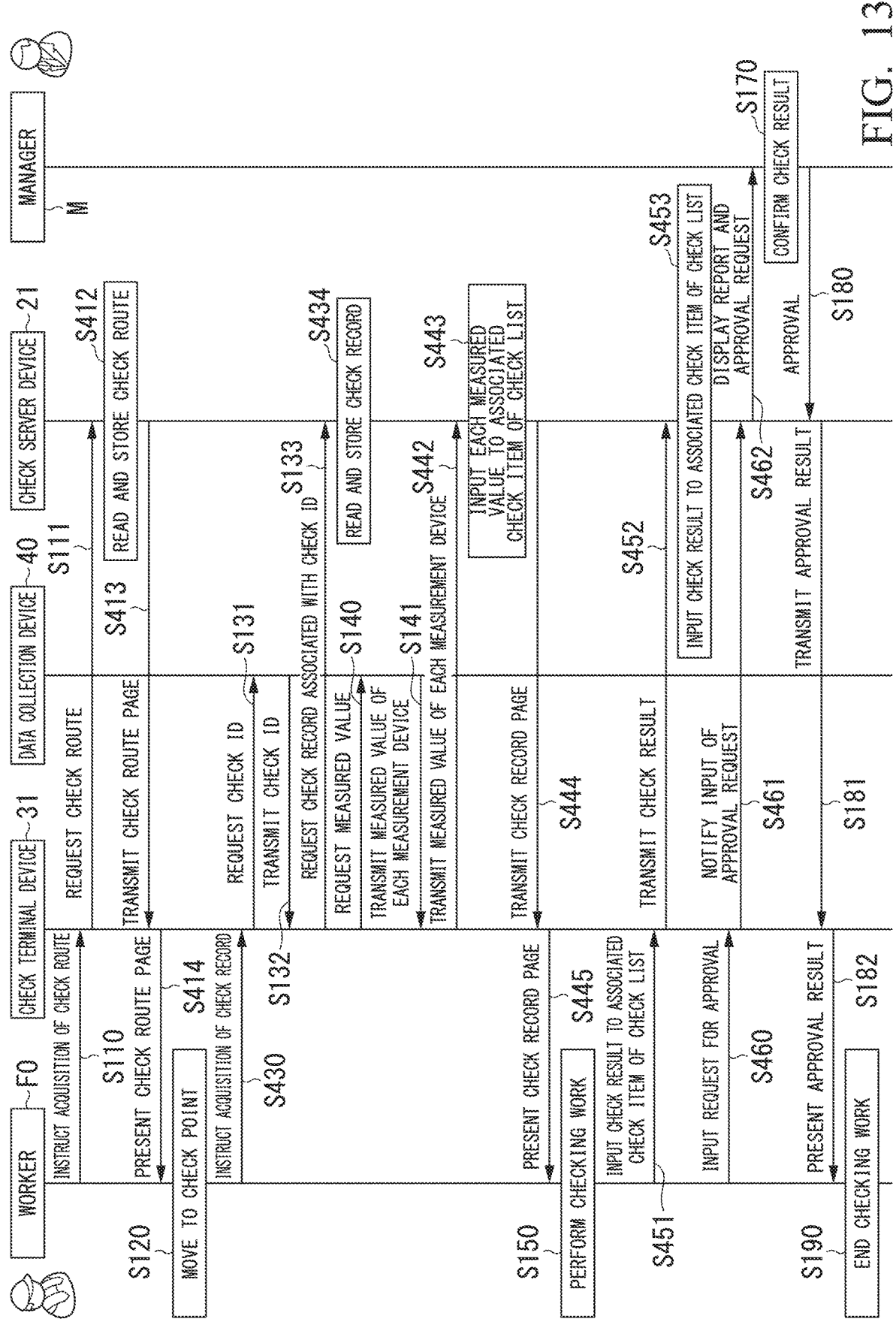
FIG. 13 is a sequence diagram showing a workflow when checking work of patrol checking is performed in a plant into which the patrol check system of the second embodiment has been built.

Next, the process or the work when checking work of patrol check is performed in the plant into which the patrol check system 2 has been built will be described. FIG. 13 is a sequence diagram showing a process (process sequence) of a flow of a process or work when checking work of patrol check is performed in the plant into which the patrol check system 2 of the second embodiment has been built. In FIG. 13, an example of a flow of respective processes in the check terminal device 31, the data collection device 40, and the check server device 21 constituting the patrol check system 2 operating when the worker FO performs checking work of patrol check, similar to the process sequence in the patrol check system 1 of the first embodiment shown in FIG. 4, are shown. In FIG. 13, work of the worker FO performing checking work in patrol checking (an operation for the check terminal device 31), and work (an operation for the check server device 21) of the manager M confirming the report of patrol check (the check result of the checking work performed at the check point) and performing approval, similar to the process sequence in the patrol check system 1 of the first embodiment shown in FIG. 4, is shown together.

In the following description, the data of the check route, the data of the check record, and the like are assumed to have already been stored in the check database 10. In the following description, the check terminal device 31 is assumed to perform exchange of data or information with the check server device 21 over the public Internet, and perform exchange of data or information with data collection device 40 through wireless communication such as WiFi (registered trademark). In the following description, server software (for example, check software) that operates as a server device in the web application type patrol check system 2 is assumed to be executed in the check server device 21, and a client program (for example, a check application program) that operates as a client device in the web application type patrol check system 2 is assumed to be executed in the check terminal device 31. For example, an application for performing a display of a display screen and receiving an operation performed with respect to the display screen in conjunction with the check software to be executed by the check server device 21 by a web browser can be considered as the check application to be executed by the check terminal device 31 in the patrol check system 2.

The process sequence in the patrol check system 2 shown in FIG. 13 includes the same processes or work as those in the process sequence in the patrol check system 1 of the first embodiment shown in FIG. 4. In FIG. 13, the same processes or work as those in the process sequence in the patrol check system 1 of the first embodiment shown in FIG. 4 are denoted with the same step numbers and shown. Accordingly, in the description of the process sequence in the patrol check system 2 shown in FIG. 13, a detailed description of the processes or the work denoted with the same step numbers as those in the process sequence in the patrol check system 1 of the first embodiment will be omitted.

First, in a preparation step in the patrol check, before the worker FO starts the patrol check, the worker FO operates the check terminal device 31 to instruct acquisition of a check route (step S110). Thus, the check terminal device 31 transmits a request for transmission of the check route to the check server device 21 over the Internet according to the instruction to acquire the check route from the worker FO in step S110 (step S111).

The check server device 21 reads the data of the check route stored (held) in the check database 10 and stores the data according to the request for transmission of the check route transmitted over the Internet (step S412). The check server device 21 transmits the data of the check route page indicating the stored check route to the check terminal device 31 (step S413). More specifically, when the client communicator 202 receives the request for transmission of the check route transmitted from the server communicator 302, the client communicator 202 outputs information indicating that the check route has been requested, to the controller 201 in step S412. Thus, the controller 201 outputs a control signal for instructing to read the data of the check route stored (held) in the check database 10 to the data interface 203. The data interface 203 searches for the data of the check route stored (held) in the check database 10, reads data matching the requested check route from the check database 10, and outputs the data to the controller 201 under the control of the reading of the check route output from the controller 201. The controller 301 outputs the data of the check route output from the data interface 203 and the control signal for instructing to write data of the check route to the check record data storage 216. The check record data storage 216 stores the data of the check route output from the controller 201 under the control of the writing of the data of the check route output from the controller 201. The controller 201 outputs the data (for example, a layer) of the check route page indicating the check route output from the data interface 203 to the client communicator 202. Thus, the client communicator 202 transmits the data of the check route page output from the controller 201 to the server communicator 302 included in the check terminal device 31 over the Internet in step S413.

The check terminal device 31 presents the check route page transmitted over the Internet to the worker FO (step S414). More specifically, when the server communicator 302 receives the data of the check route page transmitted from the client communicator 202, the server communicator 302 outputs the received data of the check route page to the controller 301. Thus, the controller 301 outputs the data of the check route page output from the server communicator 302 and a control signal for instructing to display the data of the check route page to the display 305. The display 305 presents the check route page transmitted from the check server device 21 over the Internet, to the worker FO by generating and displaying a display screen according to the data of the check route page output from the controller 301 in step S414. Thus, the worker FO can move to the initial (first) check point in a state in which the check route page is displayed on the check terminal device 31.

Then, the worker FO moves to the check point on the basis of the check route page displayed on the check terminal device 31 (step S120).

Then, in the checking work step in the patrol check, the worker FO operates the check terminal device 31 to instruct to acquire the check record in a position within the communicatable range of the current check point to which the worker FO has moved (step S430). More specifically, the worker FO operates the display screen of the display 305 included in the check terminal device 31 (for example, taps a "check record acquisition button" on the check route page) to instruct to acquire the check record in step S430. Thus, the check terminal device 31 transmits the request for transmission of the check ID to the data collection device 40 through wireless communication according to the instruction to acquire the check record from the worker FO in step S430 (step S131). Thus, the data collection device 40 transmits the information on its own check ID to the check terminal device 31 through wireless communication according to the request for transmission of the check ID transmitted through wireless communication (step S132).

When the check terminal device 31 has a configuration for automatically determining that the check terminal device 31 enters a communicatable range in which the check terminal device 31 can transmit and receive data or information to and from the data collection device 40 through wireless communication, the worker FO may not perform an operation of instructing the acquisition of the check record in step S430. In this case, the check terminal device 31 automatically starts the wireless communication with the data collection device 40 to and from which the check terminal device 31 can transmit and receive data or information, in a position within the communicatable range of the current check point to which the worker FO has moved, the request for transmission of the check ID is transmitted to the data collection device 40 in step S131, and the information on the check ID is transmitted from the data collection device 40 in step S132.

When the check terminal device 31 receives the check ID of the data collection device 40 transmitted through wireless communication, the check terminal device 31 transmits the request for transmission of the check record associated with the received check ID to the check server device 21 over the Internet (step S133).

The check server device 21 reads the data of the check record stored (held) in the check database 10 according to the request for transmission of the check record transmitted over the Internet and stores the data (step S434). More specifically, when the client communicator 202 receives the check ID and the request for transmission of the check record transmitted from the server communicator 302, the client communicator 202 outputs information on the check ID and the information indicating the request for the check record to the controller 201 in step S434. Thus, the controller 201 outputs a control signal for instructing to read the data of the check record associated with the check ID stored (held) in the check database 10 to the data interface 203. The data interface 203 searches for the data of the check record associated with the check ID stored (held) in the check database 10 under the control of the reading of the check record output from the controller 201, reads the data matching the requested check record from the check database 10, and outputs the data to the controller 201. The controller 201 outputs the data of the check record output from the data interface 203 and a control signal indicating writing of the data of the check record to the check record data storage 216. The check record data storage 216 stores the data of the check record output from the controller 201 under the control of the writing of the data of the check record output from the controller 201.

Subsequently, the check terminal device 31 transmits a request for transmission of data (measured value) of the associated measurement device 41 to the data collection device 40 through wireless communication (step S140). Thus, the data collection device 40 transmits the data of the measured value of the associated measurement device 41 to the check terminal device 31 through radio communication according to the request for transmission of the measured value of the measurement device 41 that is transmitted through wireless communication (step S141).

When the check terminal device 31 receives the data of the measured value of each measurement device 41 transmitted from the data collection device 40 through wireless communication, the check terminal device 31 transmits the received data of the measured value of the measurement device 41 to the check server device 21 over the Internet (step S442). More specifically, when the device communicator 304 receives the data of the measured value of the measurement device 41 with which the data collection device 40 is associated, which is transmitted through the wireless communication in step S141, the device communicator 304 outputs the received data of the measured value of each measurement device 41 to the controller 301. Thus, the controller 301 outputs the data of the measured value of the measurement device 41 output from the device communicator 304 and an instruction signal (control signal) indicating transmission of the data of the measured value of each measurement device 41 to the server communicator 302 in step S442. Thus, the server communicator 302 transmits the data of the measured value of the measurement device 41 to the client communicator 202 included in the check server device 21 over the Internet according to the instruction signal to transmit the data of the measured value output from the controller 301.

When the check server device 21 receives the data of the measured value of the measurement device 41 transmitted over the Internet, the check server device 21 inputs (reflects) the received data of the measured value of the measurement device 41 to the associated check item of the check list shown in the check record stored in the check record data storage 216 to update the check record stored in the check record data storage 216 (step S443). More specifically, when the client communicator 202 receives the data of the measured value of the measurement device 41 with which the data collection device 40 is associated, which has been transmitted over the Internet in step S442, the client communicator 202 outputs the received data of the measured value of each measurement device 41 to the controller 201. Thus, the controller 201 outputs the data of the measured value of each measurement device 41, and a control signal indicating updating the data area of the check result in the items of the checking work in the check list shown in the check record associated with the data of the measured value of the measurement device 41 to the check record data storage 216 in step S443. Thus, the check record data storage 216 stores (updates) the data of the measured value of the measurement device 41 output from the controller 201 in the data area of the check result of the associated check item of the check list shown in the check record on the basis of the device ID which is identification information for identifying the measurement device 41 associated with the data of the measured value of the measurement device 41 under the control of the data update from the controller 201.

The check record subjected to updating of the check record in step S443, that is, the process of inputting (reflecting) the data of the measured value of each measurement device 41 received from the data collection device 40 via the check terminal device 31 in the associated check item of the check list shown in the check record is the same as the check record in which the check terminal device 30 has reflected the data of the measured value of the measurement device 41 in the patrol check system 1 of the first embodiment. That is, this is the same as the example schematically shown using FIG. 5 in the patrol check system 1 of the first embodiment. Therefore, a detailed description of an example of a process of updating the check record in step S443 will be omitted.

The check server device 21 transmits the data of the check record page indicating the stored check record to the check terminal device 31 (step S444). More specifically, the controller 201 outputs a control signal for instructing to read the data of the check record in which the data of the measured value of the measurement device 41 has been reflected to the check record data storage 216. The check record data storage 216 outputs the data of the stored check record to the controller 201 under the control of the reading of the data of the check record output from the controller 201. The controller 201 outputs the data (for example, a layer) of the check record page indicating the check record output from the check record data storage 216 to the client communicator 202. Thus, the client communicator 202 transmits the data of the check record page output from the controller 201 to the server communicator 302 included in the check terminal device 31 over the Internet in step S444.

The check terminal device 31 presents the check record page transmitted over the Internet to the worker FO (step S445). More specifically, when the server communicator 302 receives the data of the check record page transmitted from the client communicator 202, the server communicator 302 outputs the received data of the check record page to the controller 301. Thus, the controller 301 outputs the data of the check record page output from the server communicator 302 and a control signal for instructing to display the data of the check record page to the display 305. The display 305 presents the screen check record transmitted from the check server device 21 over the Internet to the worker FO by generating and displaying the display screen according to the data of the check record page output from the controller 301 in step S445. Thus, the worker FO can confirm the check record page (the check record: the check list) displayed on the check terminal device 31 and confirm the checking work required to be performed in the position of the current check point.

Then, the worker FO performs the checking work required to be performed on the basis of the check record page displayed on the check terminal device 31 (step S150). The worker FO inputs the check result of the performed checking work to the associated check item of the check list shown in the check record (step S451). More specifically, the worker FO operates the display screen of the display 305 included in the check terminal device 31, selects the data area of the check result of the items of the checking work in the check list shown in the check record associated with the performed checking work (for example, tap the data area Fv in the check record page), and inputs the check result of the checking work in step S451. When the check result of the checking work is input by the display 305 in step S451, the controller 301 transmits the information indicating the selected data area and the input data of the check result to the check server device 21 over the Internet, similar to the process of step S442 (step S452).

When the check server device 21 receives the information on the data area and the data of the check result transmitted over the Internet, the check server device 21 inputs (reflects) the received data of the check result to the associated check item of the check list shown in the check record stored in the check record data storage 216, and updates the check record stored in the check record data storage 216, similar to the process of step S443 (step S453). More specifically, when the client communicator 202 receives the information indicating the data area and the data of the check result transmitted over the Internet in step S452, the client communicator 202 outputs the received information indicating the data area and the received data of the check result to the controller 201. Thus, the controller 201 outputs the data of the check result, and a control signal indicating updating the data area of the check result in the item of the checking work in the check list shown in the check record associated with the information indicating the data area to the check record data storage 216 in step S453. Thus, the check record data storage 216 stores (updates) the data of the check result output from the controller 201 in the data area of the check result of the check item represented in the information on the data area in the check list shown in the check record under the control of the data update from the controller 201. The controller 301 transmits the data of the check record page indicating the updated check record to the check terminal device 31 over the Internet, similar to the process of step S444. Thus, the check terminal device 31 presents the check record page transmitted over the Internet to the worker FO, similar to the process of step S445.

The worker FO repeats performing all checking work required to be performed, that is, the process and the work in steps S150 and S451 on the basis of the check record page displayed on the check terminal device 31. Thus, the data of the measured value of the measurement device 41 or the data of the check result of the checking work performed by the worker FO is reflected in all the check items in the check record page displayed on the check terminal device 31. When the worker FO confirms that there is no checking work required to be performed in the position of the current check point as a result of confirming the check record page in which the data of the measured value of the measurement device 41 presented in step S445 has been reflected, it is not necessary to perform the process and the work of steps S150 and S451.

When the work approval requestor 217 determines that the measured value of the data and the data of the check result of the measurement device 41 is stored (updated) in the data areas of all the check items included in the data of the check record stored in the check record data storage 216 through the process of storing (updating) the data area in the check record in step S443 or S453, the work approval requestor 217 outputs a notification signal indicating a state in which the request for approval of the check record as a report may be received to the controller 201.

Then, in the approval step in the patrol check, when the data of the measured value of the measurement device 41 or the data of check result of the checking work performed by the worker FO is reflected in all check items of the check record page displayed on the check terminal device 31, that is, when the checking work at the check point in the current position has ended, the worker FO instructs the request for approval of the report (step S460). More specifically, the worker FO operates the display screen of the display 305 included in the check terminal device 31 (for example, taps the "approval request button" on the check record page) to instruct the request for approval in step S460. Thus, the check terminal device 31 transmits the request for approval for the report to the check server device 21 according to the instruction of request for approval from the worker FO in step S460 (step S461). More specifically, the controller 301 outputs an instruction signal (control signal) indicating requesting the request for approval of the data of the report (check record) to the server communicator 302 in step S461. Thus, the server communicator 302 transmits the request for approval of the report (check record) to the client communicator 202 included in the check server device 21 over the Internet according to the instruction signal for requesting the request for approval output from the controller 301.

The check server device 21 presents the report and the request for approval to the manager M according to the request of approval request transmitted over the Internet (step S462). More specifically, when the client communicator 202 receives the request for approval transmitted from the server communicator 302, the client communicator 202 outputs information indicating that there has been the request for approval of the report to the controller 201. Thus, when the notification signal output from the work approval requestor 217 indicates that the request for approval of the check record as a report may be received, the controller 201 outputs a control signal for instructing to read the data of the stored check record as the report to the check record data storage 216 on the basis of the information indicating that there has been the request for approval of the report output from the client communicator 202. The check record data storage 216 outputs the data of the stored check record to the controller 201 under control of reading of the check record (report) output from the controller 201. The controller 201 outputs the data of the report output from the check record data storage 216, and a control signal indicating writing of the data of this report to the data interface 203. The data interface 203 stores (holds) the data of the report output from the controller 201 in the check database 10 under the control of the writing of the report output from the controller 201. The controller 201 outputs the data of the report output from the check record data storage 216, and a control signal for instructing to display information indicating the data of the report and the request for approval to the display 204. The display 204 presents the report in which the data of the measured value of the measurement device 41 or the data of the check result stored in the check record data storage 216 has been reflected to the manager M by generating and displaying the display screen according to the data of the report and the information on the approval request output from the controller 201 in step S462.

Then, the manager then M confirms the content of the report displayed in the check server device 21, that is, the check result of the checking work in the position of the current check point performed by the worker FO (step S170). The manager M inputs the approval result for the request for approval of the report on the basis of the content of the report displayed in the check server device 20 (step S180). Thus, the check server device 21 transmits the information report approval result to the check terminal device 31 over the Internet (step S181).

The check terminal device 31 presents the information on the approval result transmitted over the Internet to the worker FO (step S182). Thus, the worker FO can confirm the approval result for the report displayed on the check terminal device 31. When the result of the performed checking work has not been approved as a result of approving the report displayed on the check terminal device 31, the worker FO performs the process and the work of the checking work step in the patrol check and the process and the work of the approval step in the patrol check again, similar to the process sequence in the patrol check system 1 of the first embodiment shown in FIG. 4. That is, the worker FO repeats the process and the work of the steps S150 to S182 in the patrol check system 2.

A method of instructing re-checking or new check from the manager M shown in the approval result for the report is the same as a method of instructing re-checking or new checking work in the patrol check system 1 of the first embodiment. That is, the method is the same as in the example schematically shown with reference to FIG. 6 in the patrol check system 1 of the first embodiment. Therefore, a detailed description of an example of the method by which the manager M instructs the re-checking or the new checking will be omitted.

When the result of the performed checking work has been approved as a result of approving the report displayed on the check terminal device 31 in step S182, the worker FO ends the checking work in the position of the current check point (step S190). The worker FO moves (goes) to the next check point on the basis of the check route page displayed on the check terminal device 31 and similarly performs the checking work in a position within the communicatable range of the current check point to which the worker FO has moved, similar to the process sequence in the patrol check system 1 of the first embodiment. That is, the worker FO repeats the process and the work of steps S120 to S190 in the patrol check system 2 shown in FIG. 13 (the process and the work of the checking work step and the approval step in the patrol check) until the checking work at all the check points shown in the check route page displayed on the check terminal device 31 is completed.

Through a flow (process sequence) of such a process and work, in the patrol check system 2, the worker FO carries the check terminal device 31 and sequentially moves to the respective check points installed in the plant, and performs a sequence of patrol checking work while obtaining the approval of the check result of the manager M, as in the process sequence in the patrol check system 1 of the first embodiment.

In the plant into which the patrol check system 2 has been built, it is possible to associate the added measurement devices 41 with the check items of the check list shown in the check record, similar to the patrol check system 1 of the first embodiment. This can be considered similarly to the flow (process sequence) of the process and the work in the first association work shown in FIG. 9 or the second association work shown in FIG. 10 in the patrol check system 1 of the first embodiment. Accordingly, a detailed description of a flow (process sequence) of a process and work of associating the added measurement device 41 with the check items of the check list shown in the check record in the patrol check system 2 will be omitted.

As described above, in the patrol check system 2 of the second embodiment, the check terminal device 31 displays the check record page indicating the check record transmitted from the check server device 21. In other words, in the patrol check system 2 of the second embodiment, the check terminal device 31 acquires the check record from the check server device 21, similar to the patrol check system 1 of the first embodiment. In the patrol check system 2 of the second embodiment, the data collection device 40 collects the measured value acquired by the associated measurement device 41, similar to the patrol check system 1 of the first embodiment. In the patrol check system 2 of the second embodiment, the check terminal device 31 acquires the measured value of the measurement device 41 collected by the data collection device 40, and transmits the measured value to the check server device 21, and the check server device 21 reflects the measured value of the measurement device 41 transmitted from the check terminal device 31 in the associated check item of the check list shown in the check record, and transmits the check record page in which the measured value of the measurement device 41 has been reflected to the check terminal device 31. Thus, in the patrol check system 2 of the second embodiment, it is possible to obtain the same effect as those in the patrol check system 1 of the first embodiment. More specifically, in the patrol check system 2 of the second embodiment, the worker FO performing the patrol check while carrying the check terminal device 30 and patrolling the inside of the plant can confirm the check record page in which the measured value of the measurement device 41 has already been reflected, at the check point at which the worker has arrives, that is, the check record (the check list), similar to the patrol check system 1 of the first embodiment. Thus, in the patrol check system 2 of the second embodiment, the worker FO can perform only the checking work for which the measured value of the measurement device 41 is not reflected in the check record (the check list), similar to the patrol check system 1 of the first embodiment.

In the patrol check system 2 of the second embodiment, the check server device 21 presents the check record in which the measured value acquired by the measurement device 41 or the check result of the checking work has been input (reflected) as a report to the manager M who is waiting in an office or the like, for example, according to a request from the check terminal device 31. Then, in the patrol check system 2 of the second embodiment, the worker FO patrols the inside of the plant and performs the checking work while obtaining the approval of the checking work for the facilities belonging to the respective check points, similar to the patrol check system 1 of the first embodiment. Thus, in the patrol check system 2 of the second embodiment, it is possible to obtain the same effects as those in the patrol check system 1 of the first embodiment. More specifically, in the patrol check system 2 of the second embodiment, the manager M can immediately confirm the check result of the facility belonging to the check point in the current position in which there is the worker FO, and can perform an instruction of a new checking work, as necessary, similar to the patrol check system 1 of the first embodiment. In the patrol check system 2 of the second embodiment, the worker FO obtains approval of the manager M for the check result of the performed checking work, and therefore, it is possible to improve reliability of the checking work performed at the check point in the current position, similar to the patrol check system 1 of the first embodiment. In the patrol check system 2 of the second embodiment, the worker FO goes to the place in the facility once subjected to the checking work again to perform re-checking by going to the next check point after the check result of the performed checking work is approved by the manager M, and therefore, it is possible to eliminate factors which increase the time required for the checking work, and efficiently perform a sequence of patrol checking work, similar to the patrol check system 1 of the first embodiment.

In the patrol check system 2 of the second embodiment, the added measurement device 41 is associated with the check item of the check record to update the check record, and the approval of the manager M for the updated check record is obtained, similar to the patrol check system 1 of the first embodiment. Thus, in the patrol check system 2 of the second embodiment, it is possible to improve the reliability of the updated check record, and it is possible to complete a series of patrol checks only by the worker FO patrolling the inside of the plant except when the instruction of work such as re-checking and maintenance work is issued in a case in which the measurement device 41 has been associated with all the check items of the check record, similar to the patrol check system 1 of the first embodiment.

As described above, according to the embodiment of the present invention, in the patrol check system, the measurement device that measures an operation state of the facility is installed in the facility arranged in the plant, and the data collection device installed as the check point in the predetermined position in the plant collects the measured value acquired by the measurement device installed in the facility arranged in a predetermined range (area) around the check point. In the embodiments of the present invention, the worker performing the checking work in each of the facilities while patrolling the inside of the plant carries the check terminal device on which the check route has been displayed and goes to the communicatable range in which the data collection device can perform transmission and reception of data or information, thereby acquiring the check record associated with the data collection device from the check server device to the check terminal device. In this case, in the embodiments of the present invention, the measured value of the measurement devices that is collected by the data collection device and associated with the acquired check record is reflected in the check result in the check record. Thus, in the embodiments of the present invention, the measured value of the measurement device has already been reflected in the check record (check list) in a step in which the check terminal device acquires the check record associated with the data collection device. Thus, in the embodiments of the present invention, the worker can perform only the checking work of the check items in which the measured value of the measurement device is not reflected with respect to a facility around belonging to the data collection device in the position of the check point to which the worker has gone. Thus, in the embodiments of the present invention, it is possible to reduce the number of check items for which the checking work is required to be performed by the worker actually going to locations in the respective facilities, and further reduce time required for checking work that is performed on a facility belonging to the check point (data collection device) to which the worker has gone.

According to the embodiment of the present invention, the check record to which the check result of the facility belonging to the check point has been inputted is transmitted to the check server device as a report for each check point. Thus, in the embodiments of the present invention, an manager who manages an operation (function) of the respective facilities arranged in the plant can confirm the check result of the facilities belonging to the check point in an early step, and instruct the worker in the position of the check point to perform re-checking or an additional checking work for the facility, as necessary. In the embodiments of the present invention, the worker obtains the approval of the manager for the report transmitted to the check server device, and then, moves to the next check point (a communicatable range of a data collection device installed as the next check point). That is, in the embodiments of the present invention, the operator patrols the check points installed in the plant while obtaining the approval of the manager for the check result (while reliably performing the checking work) for each check point. In other words, in the embodiments of the present invention, the worker patrols the check points as in so-called Walk Rally. Thus, in the embodiments of the present invention, it is possible to improve the reliability of the checking work at each check point, and efficiently perform a sequence of patrol checking work by eliminating factors that increases time required for the checking work.

According to the embodiment of the present invention, when the measurement device to be installed in the facility has been added, the added measurement device is associated with the associated check record using the check terminal device, and the check record is updated by obtaining the approval of the manager. Thus, in the embodiments of the present invention, it is possible to reduce the number of check items for which the checking work is required to be performed by the worker actually going to locations in the respective facilities, and further reduce time required for checking work that is performed on a facility belonging to the check point (data collection device) to which the worker has gone. For example, by installing the measurement devices in all facilities arranged in the plant, there is no checking work that is performed by the worker actually going to locations in the facilities except for work instructed by the manager such as re-checking or maintenance work in a case in which the measurement devices are associated with all the check item of the check record. Eventually, the worker can complete a series of patrol checks only by patrolling the communicatable range of the data collection device installed as the check point in the plant.

In the embodiments of the present invention, the case in which the checked record (check list) in which the measured value of the measurement device or the check result of the checking work performed by the worker has been input (reflected) is used as the report, and the manager M confirms the content of this report and determines whether or not it is necessary to perform re-checking, whether or not there is checking work required to be newly performed, or whether or not the result of the checking work is approved, that is, performs approval of the report has been described. However, the method of approving the report is not limited to the method shown in each embodiment. For example, since the automatic determination function of determining the measured value input (reflected) to the data area of the check result associated with the check item in the check list shown in the report on the basis of a predetermined threshold value is included in the check server device, it may be automatically determined whether or not it is necessary to perform re-checking, whether or not there is checking work required to be newly performed, or whether or not the result of the checking work is approved. In this case, for example, in an example of the approval result for the report shown in FIG. 6, each measured value input (reflected) to the data area Fv1 of the check result associated with each of the four check items to be always performed on facility=rotation motor M1 is determined using the automatic determination function, and the graying-out of the checking work area Fw1 of check item="oil injection" is automatically released on the basis of the determination result. Thus, the time from requesting approval of the report to obtaining the approval can be further shortened.

The automatic determination function included in the check server device may be included in the check terminal device. In this case, a more highly reliable report can be transmitted to the check server device at the time of requesting approval for the report, and a sequence of patrol checking work can be performed more efficiently by reducing the number of switching between re-checking and the request for approval.

In the embodiments of the present invention, the case in which the patrol check system is used in the plant as an area in which a facility is arranged (built) has been described. However, the patrol check system of the present invention is not limited to use of in the plant. For example, the concept of the patrol check system of the present invention can also be used for patrol check of an elevator in a building or the like or patrol check such as check of crack of a water pipe or water leakage.

For example, various processes described above according to the patrol check system of this embodiment may be performed by storing a program for realizing processes performed by the respective components making up the check server device 20 (check server device 21) or the check terminal device 30 (check terminal device 31) shown in FIG. 1, 2, or 12 in a computer-readable storage medium, loading the program recorded on the storage medium to a computer system, and executing the program. The "computer system" referred to herein includes an OS or hardware such as a peripheral device. The "computer system" also includes a homepage providing environment (or display environment) when a WWW system is used. The "computer-readable storage medium" includes a flexible disk, a magneto-optical disc, a ROM, or a writable nonvolatile memory such as a flash memory, a portable medium such as a CD-ROM, or a storage device such as a hard disk built into the computer system.

The "computer-readable storage medium" also includes a storage medium that holds a program for a certain time, such as a volatile memory (dynamic random access memory (RAM)) inside a computer system including a server and a client when a program is transmitted via a network such as the Internet or a communication line such as a telephone line. The above program may be transmitted from a computer system in which the program is stored in a storage device or the like to other computer systems via a transmission medium or by transmission waves in the transmission medium. The "transmission medium" for transmitting the program refers to a medium having a function of transmitting information, such as a network (communication network) such as the Internet or a communication line such as a telephone line. The above program may be a program for realizing some of the above-described functions. The program may be a program capable of realizing the above-described functions in combination with a program previously stored in a computer system, that is, a differential file (a differential program).

The embodiments of the present invention have been described above with reference to the drawings, but specific configurations are not limited to the embodiments, and various modifications are also included without departing from the scope of the present invention.

What is claimed is:

1. A patrol check system, comprising:
   at least one data collection device installed in a first position in an area in which facilities are installed, the data collection device being configured to collect measured values indicating a state of at least one facility installed in a first range around the first position, the facility belonging to a check target of the data collection device, the measured values being measured by measurement devices installed in the facility;
   a patrol check device, comprising a controller and transmit/receive communicator, configured by the controller to communicate wirelessly with the data collection device via the communicator and acquire the measured values collected by the data collection device, and input the acquired measured values in check items of a check record which is associated with the data collection device and includes the check items to be performed on the facility belonging to the check target of the data collection device, the patrol check device being carryable by a worker; and
   a check server device comprising a storage device storing at least the check record associated with each of data collection devices and having a client-server type relationship with the patrol check device,
   wherein, while the patrol check device is carried by the worker and when the device is moved in the area, the patrol check device is configured to automatically determine that the patrol check device enters a communicatable range in which the patrol check device can transmit and receive via its communicator data to and from the data collection device through wireless communication, to automatically start the wireless communication with the data collection device to and from which the patrol check device can transmit and receive data via its communicator, and to automatically transmit a request for transmission of identification information of the data collection device to the data collection device via its communicator, wherein the data collection device is configured to transmit its own identification information to the patrol check device according to the request for transmission of the identification information, wherein the patrol check device is configured to receive via its communicator, from the data collection device, the identification information of the data collection device, wherein the patrol check device is configured to transmit via its communicator a request for transmission of a check record associated with the received identification information to the check server device, wherein the check server device is configured to search for the check record associated with the identification information stored in the storage device, to read the requested check record from the storage device, and to transmit the read check record to the patrol check device according to the request for transmission of the check record, wherein the patrol check device is configured to receive via its communicator, from the check server device, the check record associated with the identification information received from the data collection device, wherein, in the check record, the measurement devices are associated with respective one of the check items, wherein the patrol check device is configured to input the measured values measured by the measurement devices in the respective one of the check items in the check record and to transmit, to the check server device, the check record in which the measured values have been input and a request for approval for the check record, wherein the check server device is configured to present, to a manager, the check record and the request for approval, to change the check record into a state in which the worker is instructed to perform new maintenance work according to an instruction by the manager, and to transmit the changed check record to the patrol check device, wherein the patrol check device is configured to present, to the worker, the changed check record received from the check server device, wherein the patrol check device is configured to transmit, to the check server device, images which are obtained by imaging a work target place in the facility before and after performing the new maintenance work and associated with the check record, and wherein the check server device is configured to determine the result of performing the new maintenance work through image recognition for a difference between work target places reflected in the images before and after the new maintenance work received from the patrol check device.

2. The patrol check system according to claim 1,
wherein the check server device further stores, in the storage device, a check route indicating a route for patrolling the data collection devices installed in the area in which the facilities are installed, and the patrol check device is configured to display the check route acquired from the check server device, and to input measured values acquired at a position in an acquisition range in which the measured values collected by the data collection device are able to be acquired, in the check record associated with the data collection device.

3. The patrol check system according to claim 1,
wherein the patrol check device is configured to input the check record in which the measured values have been input to the check server device as a report, and display a check instruction according to the report.

4. The patrol check system according to claim 1,
wherein the patrol check device is configured to request approval of at least one of the check record in which the measured values have been input and a report of the check record, and display a result of the approval.

5. The patrol check system according to claim 1,
wherein the patrol check device further comprises
a display configured to display the check record acquired from the check server device and the check record in which the measured values have been input.

6. The patrol check system according to claim 5,
wherein the patrol check device further comprises:
a check record data storage storing at least the check record acquired from the check server device and the check record in which the measured values have been input; and
an approval requestor configured to request approval of the check record in which the measured values have been input as a report.

7. A patrol check method, comprising:
collecting measured values, using at least one data collection device installed in a first position in an area in which facilities are installed, the measured values indicating a state of at least one facility installed in a first range around the first position, the facility belonging to a check target of the data collection device, the measured values being measured by measurement devices installed in the facility;

acquiring the measured values collected by the data collection device using a patrol check device carryable by a worker and comprising a controller and transmit/receive communicator for wirelessly communicating with the data collection device having a client-server type relationship with the patrol check device; and inputting the acquired measured values in check items of a check record which is associated with the data collection device and includes the check items to be performed on the facility belonging to the check target of the data collection device using the patrol check device, wherein the patrol check method further comprises:
using the patrol check device, while the patrol check device is carried by the worker and when the device is moved in the area, for automatically determining that the patrol check device enters a communicatable range in which the patrol check device can transmit and receive data via the communicator to and from the data collection device through wireless communication, automatically starting under control of the controller the wireless communication with the data collection device to and from which the patrol check device can transmit and receive data via the communicator, and automatically transmitting a request for transmission of identification information of the data collection device to the data collection device via the communicator;

receiving via the communicator the identification information of the data collection device transmitted from the data collection device according to the request for transmission of the identification information;

transmitting via the communicator a request for transmission of a check record associated with the received identification information to a check server device comprising a storage device storing at least the check record associated with each of data collection devices; and receiving, from the check server device via the communicator, the check record associated with the identification information which is searched in the storage device and read from the storage device according to the request for transmission of the check record, wherein, in the check record, the measurement devices are associated with respective one of the check items, and wherein inputting the acquired measured values comprises inputting the measured values measured by the measurement devices in the respective one of the check items in the check record using the patrol check device and transmitting, to the check server device, the check record in which the measured values have been input and a request for approval for the check record, wherein the check server device presents, to a manager, the check record and the request for approval, to change the check record into a state in which the worker is instructed to perform new maintenance work according to an instruction by the manager, and transmits the changed check record to the patrol check device, wherein the patrol check device presents, to the worker, the changed check record received from the check server device, wherein the patrol check device transmits, to the check server device, images which are obtained by imaging a work target place in the facility before and after performing the new maintenance work and associated with the check record, and wherein the check server device determines the result of performing the new maintenance work through image recognition for a difference between work target places reflected in the images before and after the new maintenance work received from the patrol check device.

8. The patrol check method according to claim 7, further comprising:

acquiring a check route indicating a route for patrolling the data collection devices installed in the area in which the facilities are installed; and displaying the acquired check route, wherein inputting the acquired measured values comprises inputting the measured values acquired at a position in an acquisition range in which the measured values collected by the data collection device are able to be acquired, in the check record associated with the data collection device.

9. The patrol check method according to claim 7, further comprising:

inputting the check record in which the measured values have been input to the check server device as a report; and displaying a check instruction according to the report.

10. A non-transitory computer-readable storage medium storing a program, which when executed by a computer in a patrol check device carryable by a worker and comprising the computer and a receive/transmit communicator, causes the computer to:

acquire wirelessly via the communicator measured values collected by at least one data collection device installed in a first position in an area in which facilities are installed, the data collection device collecting the measured values indicating a state of at least one facility installed in a first range around the first position and having a client-server type relationship with the patrol check device, the facility belonging to a check target of the data collection device, the measured values being measured by measurement devices installed in the facility; and input the acquired measured values in check items of a check record which is associated with the data collection device and includes the check items to be performed on the facility belonging to the check target of the data collection device, wherein the program, which when executed by the computer in the patrol check device, further causes the computer to:

while the patrol check device is carried by the worker and when it is moved in the area, automatically determine that the patrol check device enters a communicatable range in which the patrol check device can transmit and receive data to and from the data collection device through wireless communication via the communicator, automatically start the wireless communication with the data collection device to and from which the patrol check device can transmit and receive data via the communicator, and automatically transmit via the communicator a request for transmission of identification information of the data collection device to the data collection device;

receive via the communicator the identification information of the data collection device transmitted from the data collection device according to the request for transmission of the identification information;

transmit via the communicator a request for transmission of a check record associated with the received identification information to a check server device comprising a storage device storing at least the check record associated with each of data collection devices; and receive, from the check server device via the communicator, the check record associated with the identification information which is searched in the storage device and read from the storage device according to the request for transmission of the check record, wherein, in the check record, the measurement devices are associated with respective one of the check items, and wherein inputting the acquired measured values comprises inputting the measured values measured by the measurement devices in the respective one of the check items in the check record and transmiting, to the check server device, the check record in which the measured values have been input and a request for approval for the check record, wherein the check server device presents, to a manager, the check record and the request for approval, to change the check record into a state in which the worker is instructed to perform new maintenance work according to an instruction by the manager, and transmits the changed check record to the patrol check device, wherein the patrol check device presents, to the worker, the changed check record received from the check server device, wherein the patrol check device transmits, to the check server device, images which are obtained by imaging a work target place in the facility before and after performing the new maintenance work and associated with the check record, and wherein the check server device determines the result of performing the new maintenance work through image recognition for a difference between work target places reflected in the images before and after the new maintenance work received from the patrol check device.

* * * * *